US012675641B2

(12) United States Patent
Vepa et al.

(10) Patent No.: US 12,675,641 B2
(45) Date of Patent: Jul. 7, 2026

(54) DETECTION OF INTERACTION EVENTS IN RECORDED AUDIO STREAMS

(71) Applicant: Observe.AI, Inc., Redwood City, CA (US)

(72) Inventors: Jithendra Vepa, Bangalore (IN); Krishnachaitanya Gogineni, Bangalore (IN); Ayush Kumar, Ranchi (IN); Digvijay Anil Ingle, Akola (IN); Murtaza Ali, Bangalore (IN); Bhasker Sharma, Bangalore (IN); Sreeram Rajagopalan, Sunnyvale, CA (US)

(73) Assignee: Observe.AI, Inc., Redwood City, CA (US)

( * ) Notice: Subject to any disclaimer, the term of this patent is extended or adjusted under 35 U.S.C. 154(b) by 169 days.

(21) Appl. No.: 18/163,062

(22) Filed: Feb. 1, 2023

(65) Prior Publication Data

US 2023/0394244 A1 Dec. 7, 2023

Related U.S. Application Data

(60) Provisional application No. 63/349,948, filed on Jun. 7, 2022.

(51) Int. Cl.
*G06F 40/35* (2020.01)
*G10L 15/18* (2013.01)
*G10L 25/87* (2013.01)

(52) U.S. Cl.
CPC .......... *G06F 40/35* (2020.01); *G10L 15/1822* (2013.01); *G10L 25/87* (2013.01)

(58) Field of Classification Search
CPC ......... G06F 40/00; G06F 40/35; G10L 15/00; G10L 15/1822; G10L 25/00; G10L 25/87
See application file for complete search history.

(56) References Cited

U.S. PATENT DOCUMENTS

| | | | | |
|---|---|---|---|---|
| 2012/0246222 A1* | 9/2012 | Martin | ................ | H04M 3/5175 709/203 |
| 2015/0195406 A1* | 7/2015 | Dwyer | .................... | G10L 15/02 379/265.07 |
| 2016/0337510 A1* | 11/2016 | Li | ............................ | G10L 25/60 |
| 2021/0158812 A1* | 5/2021 | Wooters | ................ | G10L 15/197 |
| 2021/0306459 A1* | 9/2021 | Shi | .................... | G06Q 10/06393 |
| 2022/0093093 A1* | 3/2022 | Krishnan | ................ | G10L 15/24 |
| 2023/0049813 A1* | 2/2023 | Shi | ........................... | G10L 15/16 |

OTHER PUBLICATIONS

Yang, W., Tan, L., Lu, C., Cui, A., Li, H., Chen, X., Xiong, K., Wang, M., Li, M., Pei, J. and Lin, J., Jun. 2019, Detecting customer complaint escalation with recurrent neural networks and manually-engineered features. In Proc. of the 2019 Conf., Assn. for Comp. Ling., vol. 2 (pp. 56-63) (Year: 2019).*

(Continued)

*Primary Examiner* — Sean E Serraguard
(74) *Attorney, Agent, or Firm* — Van Pelt, Yi & James LLP

(57) ABSTRACT

Detection of interaction events in recorded audio streams is disclosed, including: detecting an interaction event within a recorded audio stream; analyzing text before and after the interaction event in the recorded audio stream to determine a causer of the interaction event; and determining an action to be performed in response to the interaction event based at least in part on the causer of the interaction event.

20 Claims, 18 Drawing Sheets

100

(56)          References Cited

OTHER PUBLICATIONS

Chen et al., "Pre-Training for Spoken Language Understanding with Joint Textual and Phonetic Representation Learning", Proc. Interspeech 2021, Sep. 1, 2021.

Chowdhury et al., "Functions of Silences towards Information Flow in Spoken Conversation", Proceedings of the First Workshop on Speech-Centric Natural Language Processing, pp. 1-9, Sep. 7-11, 2017.

Cortes et al., "Support-Vector Networks", Machine Learning, 20, 273-297 (1995).

Devlin et al., "BERT: Pre-training of Deep Bidirectional Transformers for Language Understanding", NAACL 2019, May 24, 2019.

Gogineni et al., "Audio Segmentation based Conversational Silence Detection for Contact Center Calls", Interspeech 2021: Show & Tell Contribution, Aug. 30-Sep. 3, 2021.

Hershey et al., "CNN Architectures for Large-Scale Audio Classification", ICASSP 2017, Jan. 10, 2017.

Ingle et al., "Real-Time Monitoring of Silences in Contact Center Conversations", Interspeech 2022, Sep. 18-22, 2022.

Kumar et al., "What BERT Based Language Models Learn to Spoken Transcripts: An Empirical Study", Conference: Proceedings of the Fourth BlackboxNLP Workshop on Analyzing and Interpreting Neural Networks for NLP, Sep. 21, 2021.

Liu et al., "RoBERTa: A Robustly Optimized BERT Pretraining Approach", https://arxiv.org/abs/1907.11692, Jul. 26, 2019.

Melina Nikolic, "The Functions of Silence in Confrontational Discourse", Between the Acts, No. 1—Year 7, 12/20216—LC. 6.

Mirzaee et al., "A conversation analysis of the function of silence in writing conferences", Iranian Journal of Language Teaching Research 4(2), Jul. 2016.

Radford et al., "Improving Language Understanding by Generative Pre-Training", https://cdn.openai.com/research-covers/language-unsupervised/language_understanding_paper.pdf, Jun. 11, 2018.

Roy et al., "QART: A System for Real-Time Holistic Quality Assurance for Contact Center Dialogues", Proceedings of the Thirtieth AAAI Conference on Artificial Intelligence (AAAI-16) 2016.

Sundararaman et al. "Phoneme-BERT: Joint Language Modelling of Phoneme Sequence and ASR Transcript." Interspeech 2021, Aug. 30-Sep. 3, 2021.

Vaswani et al., "Attention Is All You Need", 31st Conference on Neural Information Processing Systems (NIPS 2017), Dec. 6, 2017.

Yuan et al., "Pause-Encoded Language Models for Recognition of Alzheimer's Disease and Emotion", ICASSP 2021—2021 IEEE International Conference on Acoustics, Speech and Signal Processing (ICASSP), 2021.

* cited by examiner

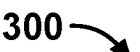
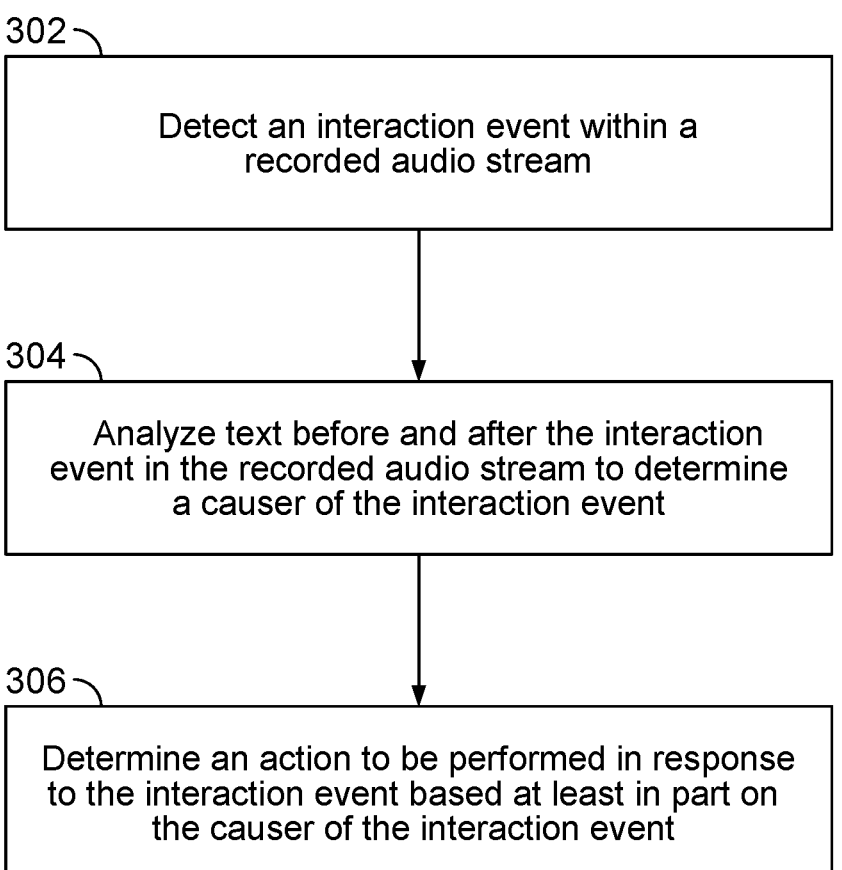
302
Detect an interaction event within a
recorded audio stream
304
Analyze text before and after the interaction
event in the recorded audio stream to determine
a causer of the interaction event
306
Determine an action to be performed in response
to the interaction event based at least in part on
the causer of the interaction event
FIG. 3

600

602

Obtain training data comprising audio segments that are annotated with corresponding interaction event types

604

Train an audio-based interaction event detection machine learning model using the training data

900

902

Obtain training data comprising text-based context before and after interaction events that are annotated with an expectation type and causer

904

Train a text-based interaction event classification machine learning model using the training data

1000

| S.No | Example | Characteristic |
|------|---------|----------------|
| 1 | Agent: do you mind if i place you on a brief hold<br>Customer: sure please go ahead<br>SILENCE *<agent taking time to search for information>*<br>Agent: thank you for holding | Type: Expected silence<br>Causer: Agent<br>Explanation: Agent explicitly informed the customer before placing on hold |
| 2 | Agent: go to top of your screen and click on login<br>Customer: okay<br>Agent: now enter the details that you just received via email<br>SILENCE *<customer taking time to enter the details>*<br>Customer: logged in | Type: Expected silence<br>Causer: Customer<br>Explanation: Agent is giving step-by-step instructions to customer and hence there is an implicit expectation that customer might take time to follow them |
| 3 | Agent: thank you for calling xyz logistics<br>Customer: i just got a call from you all<br>SILENCE *<abrupt silence>*<br>Agent: ok what is your last name | Type: Unexpected silence<br>Causer: Agent<br>Explanation: Agent intentionally or unintentionally takes time to respond |
| 4 | Agent: your email id please<br>Customer: abc at xyz dot com<br>SILENCE *<agent taking time to search for information>*<br>Customer: hello are you there | Type: Unexpected silence<br>Causer: Agent<br>Explanation: No prior indication given by agent regarding silence |

Prompt used to give indication about silence
Instructions given by agent to customer
Actual silent segment in the call

Conversation Metrics

1000 of 1000 calls

| | Avg. Call Duration | Avg. Silence Duration | Avg. Dead Air (OAI)- 10 seconds Duration | Avg. Hold Time Violation (OAI)- 120 seconds Duration |
|---|---|---|---|---|
| | 4:21 min | 234 sec | 889 sec | 145 sec |

| Agent Name | Total Calls⬆ | Avg. Call Duration⬆ | Avg. Silence Duration⬆ |
|---|---|---|---|
| Wendy Warren | 309 | 4:24 min | 231 sec |
| Tanya Nguyen | 289 | 2:34 min | 342 sec |
| Victoria Murphy | 285 | 5:24 min | 213 sec |
| Beth Henry | 273 | 4:34 min | 871 sec |
| Jane Bell | 264 | 2:24 min | 128 sec |
| Ralph Williamson | 262 | 2:39 min | 123 sec |
| Leslie Jones | 262 | 2:36 min | 451 sec |
| Wade Lane | 252 | 6:34 min | 876 sec |

FIG. 13

DETECTION OF INTERACTION EVENTS IN RECORDED AUDIO STREAMS

CROSS REFERENCE TO OTHER APPLICATIONS

This application claims priority to U.S. Provisional Patent Application No. 63/349,948 entitled DETECTION OF SILENCE IN RECORDED AUDIO filed Jun. 7, 2022 which is incorporated herein by reference for all purposes.

BACKGROUND OF THE INVENTION

Undesirable types of interaction events (e.g., containing silences, background noise) may sometimes appear during a conversation between two individuals. However, when the two individuals comprise a customer service agent (e.g., at a contact center) and a customer, then undesirable types of interaction events during the call between the two may have a negative impact on the efficacy of the service that is provided by the agent. As such, it is desirable to identify interaction events in conversations and to classify them. However, a challenge in detecting an interaction event in a conversation in recorded audio is that various types of audio can exist in the conversation and not all of them warrant further scrutiny. For example, during a conversation, there could be silences and background music that are intentionally introduced by a speaker and there could be abrupt silences and ambient noise that are not intentionally added by a speaker. Therefore, it is desirable to accurately identify interaction events in a conversation and to correctly classify the interaction events so it can be determined which of such events warrant further action.

BRIEF DESCRIPTION OF THE DRAWINGS

Various embodiments of the invention are disclosed in the following detailed description and the accompanying drawings.

FIG. 3 is a flow diagram showing an embodiment of a process for detecting interaction events in a recorded audio stream.

FIG. 10 is a diagram showing example text snippets on which a text-based interaction event classification model can be trained.

FIG. 13 is a diagram showing an example user interface that shows the information associated with recorded conversations (after the audio streams have concluded) between a group of agents and respective customers.

DETAILED DESCRIPTION

Figure 1:
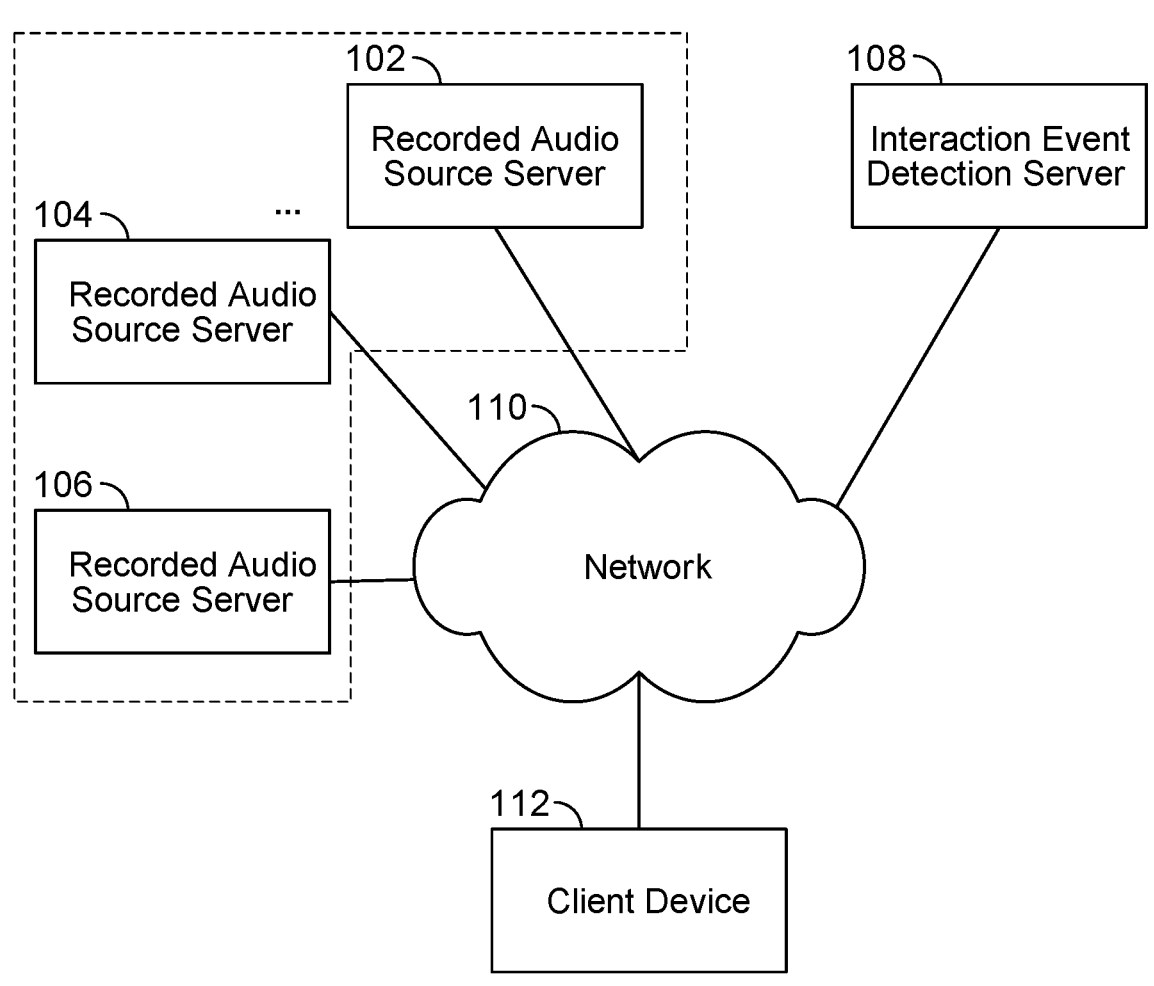
FIG. 1 is a diagram showing an embodiment of a system for detecting interaction events in a recorded audio stream.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of detecting interaction events in a recorded audio stream are described herein. An interaction event within a recorded audio stream is detected. In various embodiments, the recorded audio stream includes a conversation between at least two participants/speakers and where each participant has a corresponding role in the conversation. In a specific example, in a customer service-related conversation, the conversation may include two roles: a customer and a customer service agent. In various embodiments, the interaction event is an audio segment that includes at least one predetermined type of audio. Examples of predetermined types of audio include speech, silence, music, speech-over-music, background speech, noise, and dial-tone. After the interaction event of the predetermined type is determined, text in the text transcription of the recorded audio stream that are located temporally before and after the interaction event are used to determine which of the participants in the audio stream had caused the interaction event. For example, if the interaction event is a silence, then a participant could have caused the interaction event by indicating, prior to the interaction event, that he/she will be right back. An action to be performed in response to the interaction event is determined based at least in part on the causer of the interaction event. In some embodiments, depending on the role of the participant that had caused the interaction event, an action is performed. Examples of the action may include sending a prompt to the participant (or a supervisor thereof) that had caused the interaction event and/or storing data corresponding to the interaction event associated with the recorded audio stream (e.g., and where this stored data can be used for report generation, analytics, or downstream processing).

FIG. 1 is a diagram showing an embodiment of a system for detecting interaction events in a recorded audio stream. In the example of FIG. 1, system 100 includes recorded audio source server 102, recorded audio source server 104, recorded audio source server 106, interaction event detection server 108, network 110, and client device 112. In some embodiments, network 110 comprises data and/or telecommunications networks.

Each of recorded audio source server 102, recorded audio source server 104, and recorded audio source server 106 is configured to record audio streams and/or obtain recorded audio streams. In various embodiments, a "recorded audio stream" comprises an audio-based and/or video-based exchange between two or more participants. Examples of a recorded audio stream include a recorded phone call between two or more participants and the audio stream portion of a recorded video conference-based meeting between two or more participants, etc. In a specific example, where a recorded audio source server comprises a server located in a contact center, the participants in a recorded audio stream include a customer service agent and a customer and where the agent is assisting the customer in resolving an issue. While three recorded audio source servers (e.g., 102, 104, and 106) are shown in the example of FIG. 1, in other examples, fewer or more recorded audio source servers may be used to record audio streams and/or obtain recorded audio streams. In some embodiments, in addition to maintaining/obtaining recorded audio streams, one or more of recorded audio source server 102, recorded audio source server 104, and recorded audio source server 106 are configured to provide a text-based exchange (e.g., a chat log or a series of emails) between two or more participants.

Interaction event detection server 108 is configured to obtain recorded audio streams corresponding to exchanges between two or more participants and then detect the audio segments of predetermined types of interaction events within the audio streams. Examples of types of interaction events include speech, silence, music, speech-over-music, background speech, noise, and dial-tone. Which one or more types of interaction events that interaction event detection server 108 is to detect within an audio stream can be configurable/predetermined prior to detection. For the purpose of illustration, in several examples used herein, the type of interaction event that is detected and subsequently classified by interaction event detection server 108 is silence.

Interaction event detection server 108 is configured to detect audio segment(s) of a predetermined type of interaction event within an audio stream based on inputting portions of the audio stream into a machine learning model (which is sometimes referred to as the "audio-based interaction event detection model") that is configured to detect the presence of interaction events, if any, within the input audio segments. In some embodiments, this audio-based interaction event detection model that is configured to detect the presence of interaction events within audio segments is trained, during the training phase, on audio segments that have been annotated with the presence of the types of interaction events, if any, that are included therein. Then during the inference phase, the audio-based interaction event detection model that is configured to detect the presence of interaction events within audio segments is fed audio segments that are obtained by applying a sliding window of a predetermined length across the audio stream. The output by this audio-based interaction event detection model is a type of interaction event that is included in at least a portion of the audio segment. In the event that an input audio segment is detected to include an interaction event of a predetermined type (e.g., silence), in some embodiments, interaction event detection server 108 is configured to determine whether the recently detected interaction event is contiguous or proximate to a previously detected interaction event, in which case interaction event detection server 108 may maintain and/or send data to present, at client device 112, (e.g., which is used by one participant in the audio stream) a visualization such as a running clock that accounts for the cumulative time associated with the adjacent interaction events. A series of adjacent interaction events can also be thought of as a single continuous interaction event.

In response to detecting the location of a predetermined type of interaction event (e.g., of a selected predetermined type such as silence) within an audio stream, interaction event detection server 108 is configured to classify the interaction event based on a portion of the text transcription of the audio stream that is time aligned with the interaction event in the audio stream. In various embodiments, the text transcription that is generated from the audio stream includes tags or other indications of which participant had spoken which text and/or from which participant the detected interaction event is associated (e.g., if the interaction event is background noise then the interaction event would be tagged with the participant whose end from which the noise was detected). Furthermore, the text transcription also includes timestamps that are aligned with the timestamps of the corresponding speech or audio in the audio stream. In some embodiments, the text transcription comprises more than one text stream and where each text stream corresponds to the speech/audio/turns associated with each participant in the recorded audio stream. In some embodiments, the participant-specific text streams are generated from the portions of the audio stream that are attributed to that particular participant. In various embodiments, interaction event detection server 108 is configured to generate, for the detected interaction event, a classification comprising whether a detected interaction event is intentional/expected and also, which of the participants/speakers had caused the detected interaction event. In some embodiments, interaction event detection server 108 is configured to determine one or more other types of predefined classifications associated with the detected interaction event. Other types of predefined classifications include whether the detected interaction was associated with a positive sentiment, a negative sentiment by a corresponding speaker (e.g., a customer), an indication of a lack of comprehension of the speech spoken by another speaker (e.g., a customer not comprehending what the agent had said), a fast rate of speech, or a slow rate of speech. In some embodiments, the portion of the text transcription of the audio stream that is time aligned with the detected interaction event in the audio stream includes "contextual text," which comprises text that is in the temporal neighborhood to the time segment during the interaction event that was detected. In some embodiments, the contextual text relative to the detected interaction event may include a first set of words that precedes the interaction event in the text transcription and a second set of words that follows the interaction event in the text transcription. In various embodiments, interaction event detection server 108 is configured to classify the interaction event by feeding the contextual text relative to the interaction event into a machine learning model (which is sometimes referred to as the "text-based interaction event classification model") that is trained on text-based snippets of dialogue between two or more participants that are annotated with whether the interaction event therein was expected and also which of the participants had caused the interaction event.

In some embodiments, interaction event detection server 108 is configured to detect interaction events from an audio stream and classify such events in "real-time" (which is also sometimes referred to as "live") in the sense that the audio stream is still being recorded as the detection and classification are being performed on the portions of the audio stream that have been recorded thus far. In some embodiments, in this real-time (live) scenario, interaction event detection server 108 is configured to perform an action. One example of such an action is to send data (e.g., the cumulative time of adjacent interaction events) related to the detected interaction events and classifications thereof to client device 112 as the events are classified. Such data can be presented at a user interface that is presented at client device 112. For example, in this real-time scenario, client device 112, which may be a computer, a mobile device, a tablet, or any computing device, can be used by one of the participants of the audio stream or another party that is auditing/supervising the performance of a participant of a particular role in the ongoing audio stream. In this way, the participant or auditor thereof in the audio stream (e.g., a phone call) can be notified in real-time regarding the interaction events that have been detected/classified and if such events were not desirable (e.g., silences that are longer than an indicated length), then the participant can adjust their performance (or the auditor can coach the participant into adjusting their performance) accordingly in the remainder of the audio stream.

In some embodiments, interaction event detection server 108 is configured to detect interaction events from an audio stream and classify such events after the recording of the audio stream has been completed. In some embodiments, in this completed audio stream scenario, interaction event detection server 108 is configured to perform an action. One example of such an action is to send data related to the detected interaction events and classifications thereof to client device 112 after the entire audio stream is reviewed for the presence and classification of interaction events. Such data can be presented at a user interface that is presented at client device 112. For example, in this completed audio stream scenario, client device 112, which may be a computer, a mobile device, a tablet, or any computing device, can be used by one of the participants of the audio stream or another party that is auditing/supervising the performance of a participant of a particular role in the completed audio stream. In this way, the participant or auditor/supervisor thereof in the audio stream (e.g., a phone call) can be notified regarding the interaction events that have been detected/classified during a review of the audio stream and can adjust their (or prompt them to coach the participant's) performance accordingly in a subsequent audio stream. As will be described in further detail below, in some embodiments, the difference in the detection and classification of interaction events within audio streams in real-time (live) or after the audio streams are completed involves the amount of audio and/or text transcription that is fed into the respective classifiers. In some embodiments, in the real-time (live) scenario, relatively shorter audio and text can be used in the detection and classification to increase the speed at which the detection and classification are performed. In some embodiments, in the completed audio stream scenario, relatively longer audio and text can be used in the detection and classification to improve the accuracy with which the detection and classification are performed.

As shown in FIG. 1, various embodiments described herein enable interaction events (e.g., of one or more predetermined types) to be programmatically detected and classified (e.g., using a cascade of two different machine learning models) within a recorded audio stream, even while the audio stream is still ongoing. Statistics or other summaries derived from more than one interaction event within the audio stream can also be generated and then pushed to a client device. Where that client device is used by a participant of the ongoing audio stream, the participant can consume the interaction event related data to adjust his or her performance during the remainder of the audio stream. Where that client device is used by a participant of the completed audio stream, the participant can consume the interaction event related data to receive a holistic review of the presence/classification of interaction events within the completed audio stream and/or become informed to adjust his or her performance during a subsequent audio stream. Especially when recorded audio streams are lengthy and impractical to manually review, the programmatic detection and classification of interaction events within audio streams can provide real-time/live feedback and nuanced analysis of audio streams comprising exchanges between two or more participants.

Figure 2:
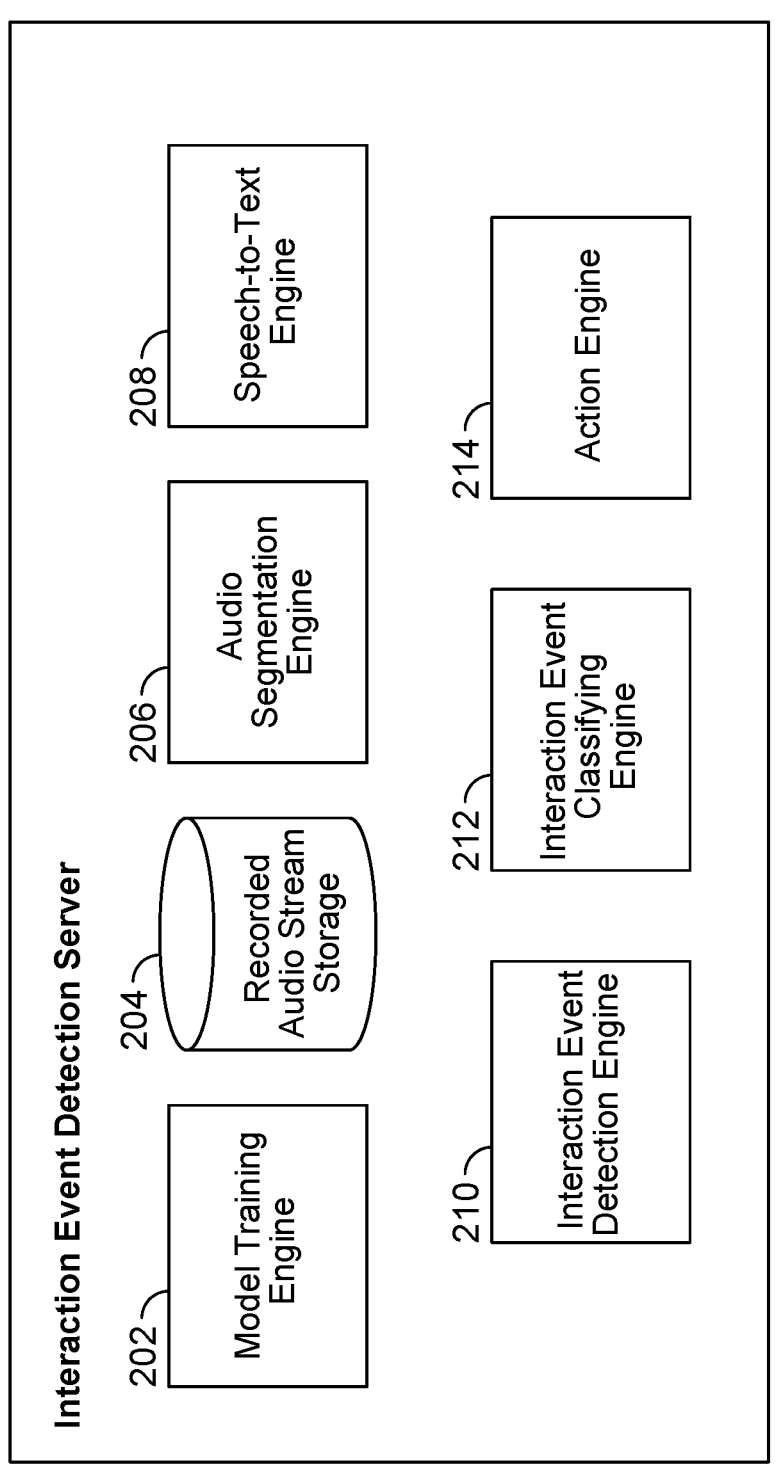
FIG. 2 is a diagram showing an example of an interaction event detection server.

FIG. 2 is a diagram showing an example of an interaction event detection server. In some embodiments, interaction event detection server 108 of FIG. 1 may be implemented using the example interaction event detection server as described in FIG. 2. As shown in FIG. 2, the example interaction event detection server includes model training engine 202, recorded audio stream storage 204, audio segmentation engine 206, speech-to-text engine 208, interaction event detection engine 210, interaction event classifying engine 212, and action engine 214. Each of model training engine 202, recorded audio stream storage 204, audio segmentation engine 206, speech-to-text engine 208, interaction event detection engine 210, interaction event classifying engine 212, and action engine 214 can be implemented using hardware and/or software.

Model training engine 202 is configured to train an audio-based interaction event detection model. In some embodiments, model training engine 202 is configured to train a machine learning model based on audio segments of exchanges between two or more participants and where those audio segments are annotated with their corresponding types of interaction events. For example, the audio segments that are used to train the model may include audio segments that are correspondingly annotated with the following one or more types of interaction events: speech (e.g., by one or more participants in the exchange), silence (e.g., no speech and no music), music, speech-over-music, background speech (e.g., a conversation is in the background), noise, and dial-tone. In some embodiments, the audio segments are obtained from recorded audio streams and then manually annotated with corresponding interaction event types. In a specific example, a Bi-rnn powered architecture followed by a softmax layer is used for training. For example, each training audio segment is of a predetermined length (e.g., 500-1000 millisecond (ms)) and is divided into multiple audio frames. The at least subset of frames within each audio segment that includes an interaction event is annotated with the corresponding type of interaction event. One advantage to training the model with audio segments that include audio that precedes and also follows an interaction event is that the model learns the contextual audio that may be temporal neighbors to an actual interaction event. The resulting model, which is the audio-based interaction event detection model, is therefore trained to, during inference, take as input an audio segment vector of the predetermined length and then output a detected interaction event type within the input audio segment.

Model training engine 202 is configured to train a text-based interaction event classification model. In some embodiments, model training engine 202 is configured to train a machine learning model based on snippets of text transcriptions of exchanges between two or more participants and where those text snippets, which correspond to audio segments that include interaction events, include annotated text that precedes and also follows the interaction event. For example, each training audio segment is of a predetermined length (e.g., 900 ms) and is divided into multiple audio frames. For example, the text snippets that are used to train the model are annotated with the turns/text/audio associated with each respective participant's roles (e.g., customer and agent, teacher and student), the length category of the interaction event (or adjacent interaction events). In a specific example, each text snippet is annotated with tokens that designate each participant's role's turn and also the category of the duration of the interaction event (e.g., short (3-5 seconds long), medium (5-10 seconds long), and long (e.g., 10+ seconds long)) in the corresponding locations among the text transcription. Furthermore, each text snippet is annotated with the left context (e.g., the text transcription that precedes the interaction event) and the right context (e.g., the portion of the text transcription that follows the interaction event). Lastly, each text snippet is also annotated with whether 1) the interaction event was expected (e.g., whether it was signaled by a participant prior to its occurrence) and 2) which of the participants in the exchange had caused the interaction event (e.g., which of the participants had performed an action or introduced the interaction event). In some embodiments, the text snippets used for training are manually annotated. In a specific example, a RoBERTa model is used for training. One advantage to training the model with text snippets that are annotated with left/before and right/after contextual text is that the model learns the contextual text that may be temporal neighbors to an actual interaction event. The resulting model, which is the text-based interaction event classification model, is therefore trained to, during inference, take as input a set of text that is time aligned with an interaction event that is detected in an audio stream by the audio-based interaction event and then output two classifications: 1) whether the interaction was expected or unexpected and 2) which of the participants of the exchange had caused the interaction event.

In some embodiments, model training engine 202 is configured to train additional text-based classification models that receive annotated text snippets as described above. The other text-based classification models can be trained to output one or more other types of classifications associated with the detected interaction event such as, for example, whether the detected interaction was associated with a positive sentiment, a negative sentiment expressed by a participant, a lack of comprehension by a participant, a fast rate of speech, or a slow rate of speech.

Recorded audio stream storage 204 is configured to store recorded audio streams. In some embodiments, the audio streams stored at recorded audio stream storage 204 are obtained from external sources, such as, for example, a server inside a contact center and that is configured to record phone conversations between a customer and a customer service agent. In some embodiments, the audio streams stored at recorded audio stream storage 204 are the audio portions of recorded video conferences. In some embodiments, each recorded audio stream comprises two or more substreams, where each substream corresponds to the audio/speech provided by a distinct participant/speaker in the conversation/exchange. In some embodiments, an audio stream that is stored in recorded audio stream storage 204 is still ongoing, in that additional portions of the audio stream are added to the stored version over time. In some embodiments, an audio stream that is stored in recorded audio stream storage 204 has completed.

Audio segmentation engine 206 is configured to segment audio in an audio stream into frames. In some embodiments, audio segmentation engine 206 is configured to segment audio streams stored at recorded audio stream storage 204, including audio streams that are still being recorded or audio streams that have been completed. In a specific example, each audio frame can be 100 millisecond (ms) in duration.

Speech-to-text engine 208 is configured to transcribe the audio/speech of an audio stream into text. In some embodiments, the text transcription of an audio stream (e.g., such as the audio streams that are stored at recorded audio stream storage 204) includes timestamps that are time aligned with when the transcribed text and audio descriptions appear within the original audio stream. In some embodiments, the text transcription also includes annotations or the separation of text that belongs to different speaking turns of different participants/roles.

Interaction event detection engine 210 is configured to detect interaction events within an audio stream. In various embodiments, interaction event detection engine 210 is configured to detect interaction events within an audio stream based on audio segments that have been obtained from that audio stream. In particular, a set of adjacent audio frames that have been segmented from the audio stream are input by model training engine 202 into the audio-based interaction event detection model that was trained by interaction event detection server 108 to determine an interaction event exists across at least a subset of the frames. For example, if audio-based interaction event detection model was trained on audio segments of 500 ms in duration, then each audio segment would include five 100 ms frames and the audio-based interaction event detection model could determine whether the center frames comprising the middle three 100 ms frames include an interaction event. The frames to the left (older) and to the right (newer) of the center frames provide context to aid the audio-based interaction event detection model in determining whether the center frames include an interactive event. In some embodiments, the number of frames to the left (older) and the number to the right (newer) of the center frames in which an interaction event is examined are configurable and may vary depending on whether the detection of interaction events in the audio stream is being performed in real-time/live (e.g., as the audio stream is still being recorded) or after the audio stream is completed. For example, if the detection of interaction events is being performed in real-time, then to prioritize the speed of detection, a greater number of older than new frames relative to the center frames can be included in each audio segment that is fed into the audio-based interaction event detection model (so that the detection does not need to wait for the recording of more newer frames). In another example, if the detection of interaction events is being performed after the audio stream is complete, then to prioritize the accuracy of detection, the same number of frames that are older and also newer relative to the center frames can be included in each audio segment that is fed into the audio-based interaction event detection model. In some embodiments, a sliding window of the length/duration associated with the audio segments that are to be fed into the audio-based interaction event detection model is slid along the frames that are segmented from an audio stream and where the set of frames within each window is fed into the audio-based interaction event detection model to detect whether an interaction event and also, the audio type associated with the interaction event, is included therein. In some embodiments, if an interaction event of a predetermined type of audio is determined by the audio-based interaction event detection model, then the timestamps corresponding to that interaction event are provided to interaction event classifying engine 212 to classify that interaction event. For example, if the detected interaction event includes a silence, then the information (e.g., timestamps) corresponding to that silence is provided to interaction event classifying engine 212 to classify that silence. In some embodiments, in the event that interaction event detection engine 210 detects interaction events in adjacent audio segments/windows that overlap in time, then interaction event detection engine 210 is configured to maintain a running clock of the cumulative length/duration of the overlapping/adjacent interaction events.

Interaction event classifying engine 212 is configured to use the time information (e.g., timestamps) corresponding to interaction events (e.g., of a predetermined type) detected by interaction event detection engine 210 to identify text snippets from the same audio stream to use to classify those events. In various embodiments, model training engine 202 is configured to identify contextual text relative to the interaction event including: a first set of words that precede (are to the left of) the timestamps of an interaction event and to determine a second set of words that follow (are to the right of) the timestamps of the interaction event in the text transcription (e.g., that was generated by speech-to-text engine 208) of the audio stream from which the interaction event was determined. In some embodiments, the number of words to the left (that precede) and the number of words to the right (that follow) of the timestamps of the interaction event in the text transcription of the audio stream are predetermined depending on whether the interaction event classification is being performed in real-time/live (e.g., as the audio stream is still being recorded) or after the audio stream is completed. For example, if the classification of interaction events is being performed in real-time, then to prioritize the speed of detection, a greater number of words to the left of the interaction event in the text transcription can be included in each text snippet (so that the detection does not need to wait for the recording and transcription of additional speech) that is fed into the text-based interaction event classification model. In another example, if the detection of interaction events is being performed after the audio stream is complete, then to prioritize the accuracy, a similar number of words to the left and to the right of the interaction event in the text transcription can be included in each text snippet that is fed into the text-based interaction event classification model. The output of the text-based interaction event classification model is classifications of the input text including 1) whether the input text is expected or unexpected and 2) which of the participants had caused the interaction event.

Action engine 214 is configured to compare the detection and classification of interaction events within an audio stream to stored rules, dynamically generated rules, and rules generated by an intelligent system to perform actions. In a first example, a rule can indicate that if the cumulative time of adjacent interaction events (e.g., a silent segment) in an ongoing audio stream exceeds a predetermined length of time (e.g., 2 minutes), then action engine 214 is configured to send a prompt to the participant that has caused that silence to cause that participant to return to the ongoing conversation/audio stream with additional speech. In a second example, a rule can indicate that if more than a predetermined statistic related to (e.g., total number of) interaction events in a completed audio stream have been caused by a participant with a specified role (e.g., a customer service agent), then action engine 214 is configured to send a recommendation to a supervisor so that the supervisor can intervene (e.g., in real-time) to provide coaching to the agent and/or to present a graphic at a user interface for the agent to review. In a third example, a rule can indicate that if the cumulative time of adjacent interaction events (e.g., a silent segment) in an ongoing audio stream exceeds a predetermined length of time (e.g., 2 minutes), then action engine 214 is configured to store data indicating this occurrence and where such stored data can be used for report generation, analytics, and/or other forms of downstream processing.

FIG. 3 is a flow diagram showing an embodiment of a process for detecting interaction events in a recorded audio stream. In some embodiments, process 300 is implemented on interaction event detection server 108 of FIG. 1.

At 302, an interaction event is detected within a recorded audio stream. An interaction event comprising an audio segment of a predetermined audio type (e.g., speech, silence, music, speech-over-music, background speech, noise, and dial-tone) is determined within a recorded audio stream by inputting audio portions (e.g., that are within a sliding window) of the recorded audio stream to a pre-trained audio-based interaction event detection model. The audio-based interaction event detection model is configured to output a category/audio type of an interaction event that was detected within the input. In various embodiments, where an interaction event that is detected by the audio-based interaction event detection model is associated with a predetermined type, the audio-based interaction event detection model is also configured to output time information (e.g., timestamps) corresponding to when the interaction event was detected within the recorded audio stream. In some embodiments, the audio stream is still ongoing and so the interaction event can be detected in "real-time" (while the audio is still "live" and being recorded). In some embodiments, the audio stream has completed and so the interaction event can be detected after the completion of the recording of the audio stream.

At 304, text before and after the interaction event in the recorded audio stream is analyzed to determine a causer of the interaction event. A text transcription of the recorded audio stream that is time aligned with (e.g., include time-stamps that correspond to) the speech and other audio within the audio stream is obtained. Using the time information that is determined for the detected interaction event, text that temporally precedes the duration of the interaction event and text that temporally follows the duration of the interaction event within the text transcription are obtained and then input into a text-based interaction event classification model. The text-based interaction event classification model is configured to output at least which of the participants/speakers/roles within the recorded audio stream had caused the interaction event. In some embodiments, the text-based interaction event classification model is also configured to output whether the interaction event was expected or unexpected. In some embodiments, another text-based interaction event can also receive text input surrounding a detected interaction event and output one or more other types of classifications associated with the detected interaction event such as, for example, whether the detected interaction was associated with a positive sentiment, a negative sentiment, a fast rate of speech, or a slow rate of speech.

At 306, an action to be performed is determined in response to the interaction event based at least in part on the causer of the interaction event. The causer, whether the interaction event was expected or not, and/or other attributes of the interaction event (along with zero or more other interaction events that were detected/classified from the same audio stream) are compared against rules to determine which action is to be performed. An example action is to send data to a client device of a participant of the recorded audio stream to present a prompt at a user interface at the client device. The prompt can include an attribute/statistic (e.g., a cumulative length) that is determined from detected interaction events, which can cause the participant to change their behavior (e.g., during the remainder of the audio stream if the audio stream is still ongoing).

Figure 4:
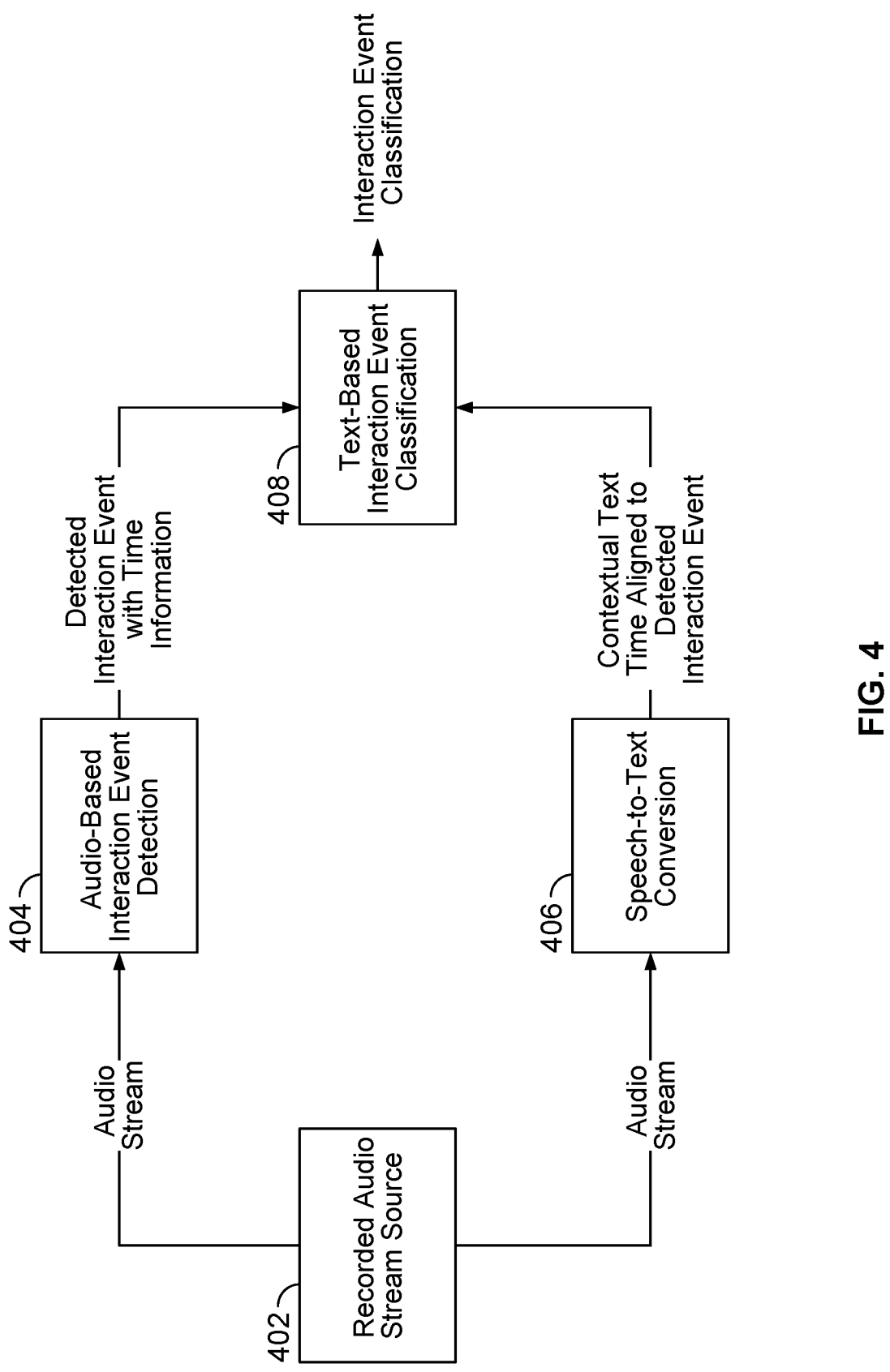
FIG. 4 is a diagram showing an example diagram of the cascaded system of interaction event detection and then classification in accordance with some embodiments.

FIG. 4 is a diagram showing an example diagram of the cascaded system of interaction event detection and then classification in accordance with some embodiments. An audio stream from recorded audio stream source 402 is sent to audio-based interaction event detection 404 and also speech-to-text conversion 406. Based on the audio stream, audio-based interaction event detection 404 is configured to detect interaction events within the audio stream and output time information (e.g., timestamps within the audio stream) corresponding to each interaction event. Then, contextual text (comprising text that precedes and follows the time-stamps of the interaction event) within the text transcription of the audio stream that is generated by speech-to-text conversion 406 is input into text-based interaction event classification 408. Based on the contextual text relative to the detected interaction event, text-based interaction event classification 408 is configured to output one or more classifications of the detected interaction event. Example classifications include whether the interaction event was expected or unexpected and which of the participants in the audio stream had caused the interaction event. While not shown in FIG. 4, the classification(s) can be compared to rule(s) to determine whether an action should be performed. As shown in FIG. 4, some embodiments described herein provide a sequential/cascaded system of an audio-based interaction event detection followed by a corresponding text-based interaction event classification of the detected interaction event.

Figure 5:
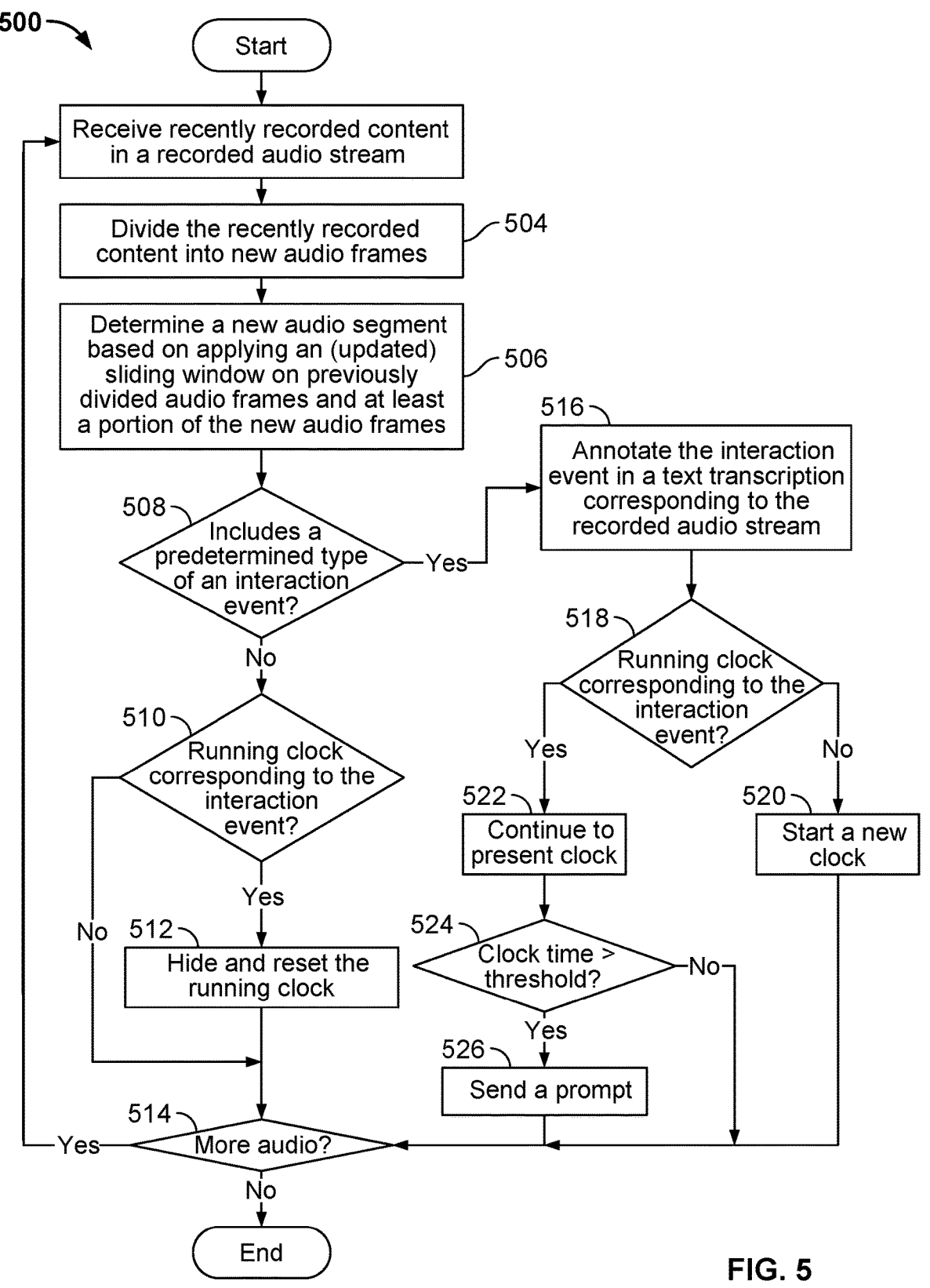
FIG. 5 is a flow diagram showing an example of a process for detecting interaction events within a recorded audio stream in accordance with some embodiments.

FIG. 5 is a flow diagram showing an example of a process for detecting interaction events within a recorded audio stream in accordance with some embodiments. In some embodiments, process 500 is implemented at interaction event detection server 108 of FIG. 1. In some embodiments, step 302 of process 300 of FIG. 3 may be performed using a process such as process 500.

Process 500 describes an example process for performing real-time (live) interaction event detection in an audio stream that is still being recorded. As will be described in process 500, a sliding window is slid across the audio stream, even as new audio content is recorded/added, to determine whether an interaction event is included in the audio segment that is included in each window.

At 502, recently recorded content in a recorded audio stream is received. For example, the audio stream is a recorded phone conversation or a video conference.

At 504, the recently recorded content is divided into new audio frames. The newly recorded audio content is segmented into audio frames of a given duration. For example, each audio frame is 100 ms in length.

At 506, a new audio segment is determined based on applying an (updated) sliding window on previously divided audio frames and at least a portion of the new audio frames. In some embodiments, a sliding window of a predetermined length is slid across all the audio frames of the audio stream (from the earliest to the latest recorded audio frames) and those audio frames that are included in each window are input into an audio-based interaction detection model that is configured to determine whether a subset of the audio frames within the center of the set of audio frames includes an interaction event. For example, the sliding window is 500 ms in duration (includes five 100 ms audio frames) and each time that the sliding window shifts, it moves 200 ms to the right (e.g., the sliding window shifts to exclude the two oldest audio frames and adds two new 200 ms audio frames) in the audio stream.

At 508, whether the new audio segment includes an interaction event of a predetermined type is determined. In the event that the new audio segment includes an interaction event of a determined type, then control is transferred to 516. Otherwise, in the event that the new audio segment does not include an interaction event of the determined type, then control is transferred to 510. The audio frames that are currently included in the sliding window are then fed into an audio-based interaction event detection model. In response, the audio-based interaction event detection model is configured to, in some embodiments, determine whether at least a subset of frames in the temporal center of the updated sliding window includes an interaction event. Examples of an interaction event include speech, silence, music, speech-over-music, background speech, noise, and dial-tone. In some embodiments, only predetermined types of interaction events are further processed in process 500. For example, only predetermined types of interaction events which are silences that are detected at step 508 are configured to be processed in process 500, including determining whether an action, such as sending a prompt at step 526, should be performed.

At 510, whether a running clock corresponding to the interaction event exists is determined. In the event that there does exist a running clock corresponding to the interaction event, control is transferred to 512. Otherwise, in the event that there does not exist a running clock corresponding to the interaction event, control is transferred to 514. If there is a series of interaction events (which could also be referred to as a single "continuous interaction event") that had been detected in one or more consecutive sliding windows, a running clock could be started in response to the detection of the first of such interaction events to track the cumulative duration of the continuous interaction event. When an interaction event is not detected within the new audio segment corresponding to the updated sliding window but a clock had been started in response to a previously detected interaction event, it means that the continuous interaction event that had been detected in one or more consecutive sliding windows has now ended. For example, where the detected interaction events across consecutive sliding windows were silences, then the running clock can be started in response to the initial detection of a silence in the audio stream to track how long the silence persists for in the conversation.

At 512, the clock is hidden and reset. In response to the lack of detection of the interaction event in the new audio segment of the updated sliding window, the previously existing running clock can be reset and hidden from view (if it had been previously presented at a user interface to inform at least one participant in the audio stream of the continuous nature of adjacently detected interaction events).

At 514, whether there is additional audio content in the recorded audio stream is determined. In the event that there is additional audio content in the recorded audio stream, control is returned to 502. Otherwise, in the event that there is no additional audio content in the recorded audio stream (e.g., the audio stream is complete), process 500 ends. If the audio stream has not completed, then control returns to step 502 to determine whether an interaction event exists in the next audio segment, which is included in a shifted sliding window.

At 516, the interaction event is annotated in a text transcription corresponding to the recorded audio stream. Where an interaction event is detected, its timestamps within the audio stream can be annotated within a text transcription of the audio stream and where the text transcription is time aligned with the audio stream. The timestamps of the interaction event can then be used to identify contextual text corresponding to the interaction event in the text transcription. As will be described in further detail, the contextual text of an interaction event is to be fed into a text-based interaction event classification model that is configured to output one or more classifications corresponding to the interaction event.

At 518, whether a running clock corresponding to the interaction event exists is determined. In the event that there does exist a clock corresponding to the interaction event, control is transferred to 522. Otherwise, in the event that there does not exist a clock corresponding to the interaction event, control is transferred to 520.

At 520, a new clock is started. If a clock has not already been started, meaning that there has not been a series of interaction events detected in adjacent sliding windows prior to this detected interaction event, then a new clock is started in response to this detected interaction event. The new clock could also be presented at a user interface.

At 522, the clock is continued to be presented. Otherwise, if such a clock has already been started, then that existing clock is continued to be presented at a user interface at a client device of a participant in the audio stream.

At 524, whether the clock time is greater than a threshold is determined. In the event that the clock time is greater than a threshold, control is transferred to 526. Otherwise, in the event that the clock time is not greater than a threshold, control is transferred to 514. If the time that is tracked by the running clock is greater than a threshold duration, then a prompt message is sent to the interface at a client device of a participant in the audio stream. For example, the participant may be associated with a particular role (e.g., the role of the customer service agent within an exchange between a customer and the agent).

At 526, a prompt is sent. For example, a series of interaction events (detected silences) across adjacent sliding windows with a cumulative duration that is longer than the threshold duration is undesirable and so a prompt message can potentially remind a participant in the conversation to avoid prolonging the silence and/or avoid introducing another long silence later in the conversation. For example, the threshold duration and zero or more other conditions for sending the prompt and also how to send the prompt may be included in a stored rule that provides conditions for when an action is to be performed.

While process 500 describes detecting interaction events in real-time within ongoing audio streams, a similar process of using a sliding window to slide along an audio stream can also be performed on a completed audio stream to detect interaction events. In the case of the completed audio stream, the shifting of the sliding window would not need to be limited/constrained by the availability of newly recorded audio content.

Figure 6:
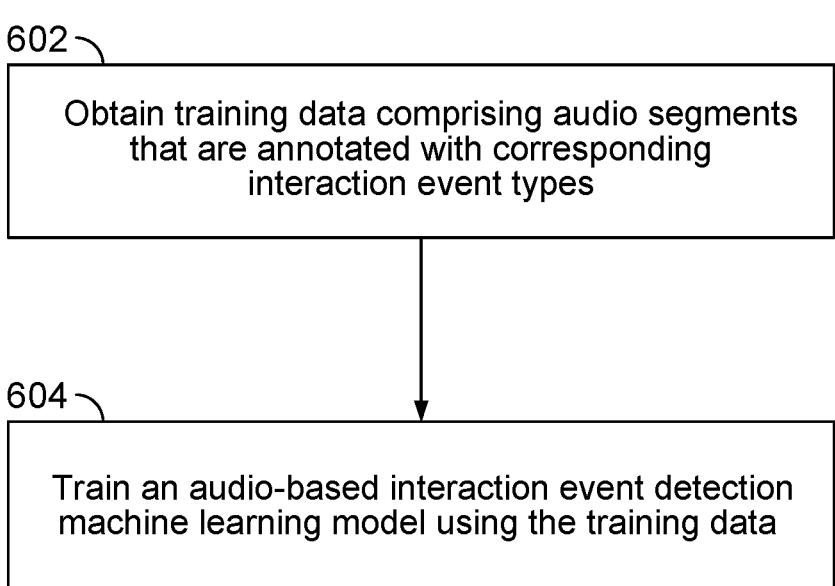
FIG. 6 is a flow diagram showing an example of a process for training an audio-based interaction event detection machine learning model in accordance with some embodiments.

FIG. 6 is a flow diagram showing an example of a process for training an audio-based interaction event detection machine learning model in accordance with some embodiments. In some embodiments, process 600 is implemented at interaction event detection server 108 of FIG. 1.

Process 600 describes one example technique of training an audio-based interaction event detection model, which is used in various embodiments described herein. For example, the audio-based interaction event detection model is used at step 302 in process 300 of FIG. 3 and step 508 in process 500 of FIG. 5.

At 602, training data comprising audio segments that are annotated with corresponding interaction event types is obtained. In a specific example, recordings from contact centers across different industries are obtained and then divided into audio segments. Each audio segment is then manually annotated with one of a finite set of categories/types: speech, silence, music, speech-over-music, background speech, noise, and dial-tone. For example, an audio segment has a duration that is in between 500 ms and 1000 ms. In some embodiments, each audio segment could further be segmented into audio frames of the same size. For example, if an audio segment were 500 ms in duration, then each audio frame could be 100 ms in duration and therefore, that audio segment would include five audio frames.

At 604, an audio-based interaction event detection machine learning model is trained using the training data. Features are then extracted (e.g., using a Vggish feature extractor) from the audio segments and then used to train a Bi-rnn power architecture followed by a softmax layer, which leverages the left and right context of an audio segment to decide its particular corresponding interaction event category/type. The resulting model, the audio-based interaction event detection model, is configured to receive as input an audio segment and as output a category of interaction type that is included in that audio segment. In a specific example in which an input audio segment is divided into audio frames, the audio-based interaction event detection model is configured to determine an interaction event category/type corresponding to the center audio frames of the audio segment based on the audio frame(s) of the same audio segment that are to the left and the right of the center frames.

Figure 7:
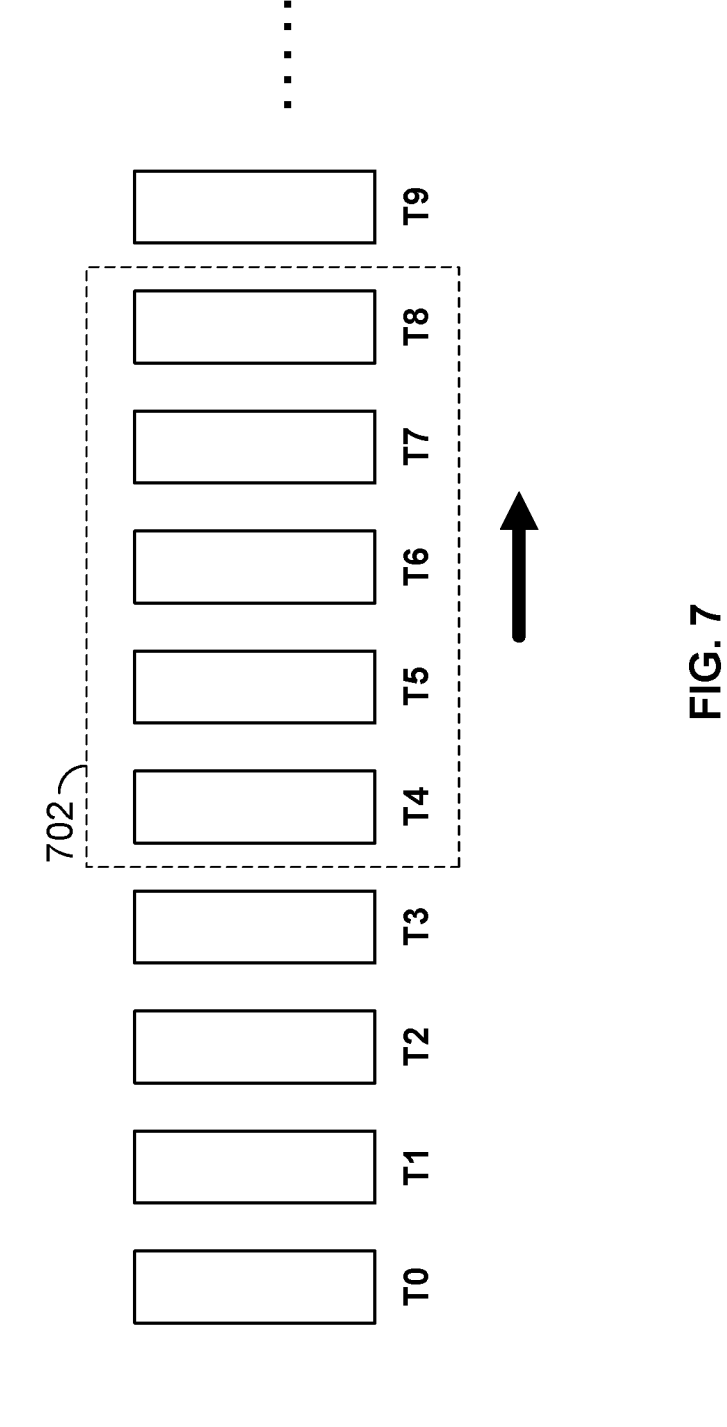
FIG. 7 is a diagram showing an example of a sliding window being slid across a recorded audio stream to facilitate the detection of interaction events in the recorded audio stream.

FIG. 7 is a diagram showing an example of a sliding window being slid across a recorded audio stream to facilitate the detection of interaction events in the recorded audio stream. In some embodiments, steps 506 and 508 of process 500 of FIG. 5 may be performed using a technique such as the technique shown in FIG. 7. FIG. 7 shows recorded audio stream 700 having been segmented into audio frames: T0, T1, T2, T3, T4, T5, T6, T7, T8, T9, and so forth. For example, each audio frame is 100 ms in duration. In this specific example, sliding window 702 is five audio frames in duration. If each audio frame were 100 ms in duration, then sliding window 702 would be 500 ms in duration. In this example, the audio-based interaction event detection model receives the 500 ms audio segment that is currently included in sliding window 702 and determines the interaction event type that is associated with the three center audio frames based at least in part on the audio frames to the left and to the right of those three center audio frames. While not shown in FIG. 7, sliding window 700 initially included audio frames T0, T1, T2, T3, and T4. The audio segment that comprised T0, T1, T2, T3, and T4 was then fed into the audio-based interaction event detection model, which then determined the interaction event type that is included in center frames T1, T2, and T3, based at least in part on the audio context of the left audio frame, T0, and the right audio frame, T4. In the example of FIG. 7, each time sliding window 702 is updated, it is shifted down by two audio frames. As such, after shifting from including audio frames T0, T1, T2, T3, and T4, sliding window 702 is shifted to include audio frames T2, T3, T4, T5, and T6, and then shifted again to include T4, T5, T6, T7, and T8 (as shown in FIG. 7), and so forth. For the audio segment that is included in sliding window 702 in FIG. 7, the audio-based interaction event detection model determines the interaction event type that is included in center frames T5, T6, and T7, based at least in part on the audio context of the left audio frame, T4, and the right audio frame, T8.

If the same interaction event type is determined in the center frames of consecutive and overlapping sliding windows, then the center frames across the audio segments in those consecutive sliding windows can be thought of as one, continuous interaction event. For example, if a silence is detected within five consecutive and overlapping sliding windows, then one continuous silent segment is determined to span the center frames of those five sliding windows.

As mentioned above, a recorded audio stream could still be in progress or have been completed as interaction events are detected within the audio. In the event that the recorded audio stream is still in progress and hence the interaction event type detection is performed in real-time, the sliding window such as sliding window 702 could include more left context audio frames to be used to determine an interaction event type corresponding to the center frames, which may not be completely centered on the center frame within the window, so as to reduce the amount of waiting (to speed up detection) that is needed for newer audio content to be recorded to form the right context audio frames of the sliding window. In the event that the recorded audio stream has been completed and hence the interaction event type detection is not performed in real-time, the sliding window such as sliding window 702 could include a similar number of left context audio frames and right context audio frames since all the audio frames are already available.

Figure 8:
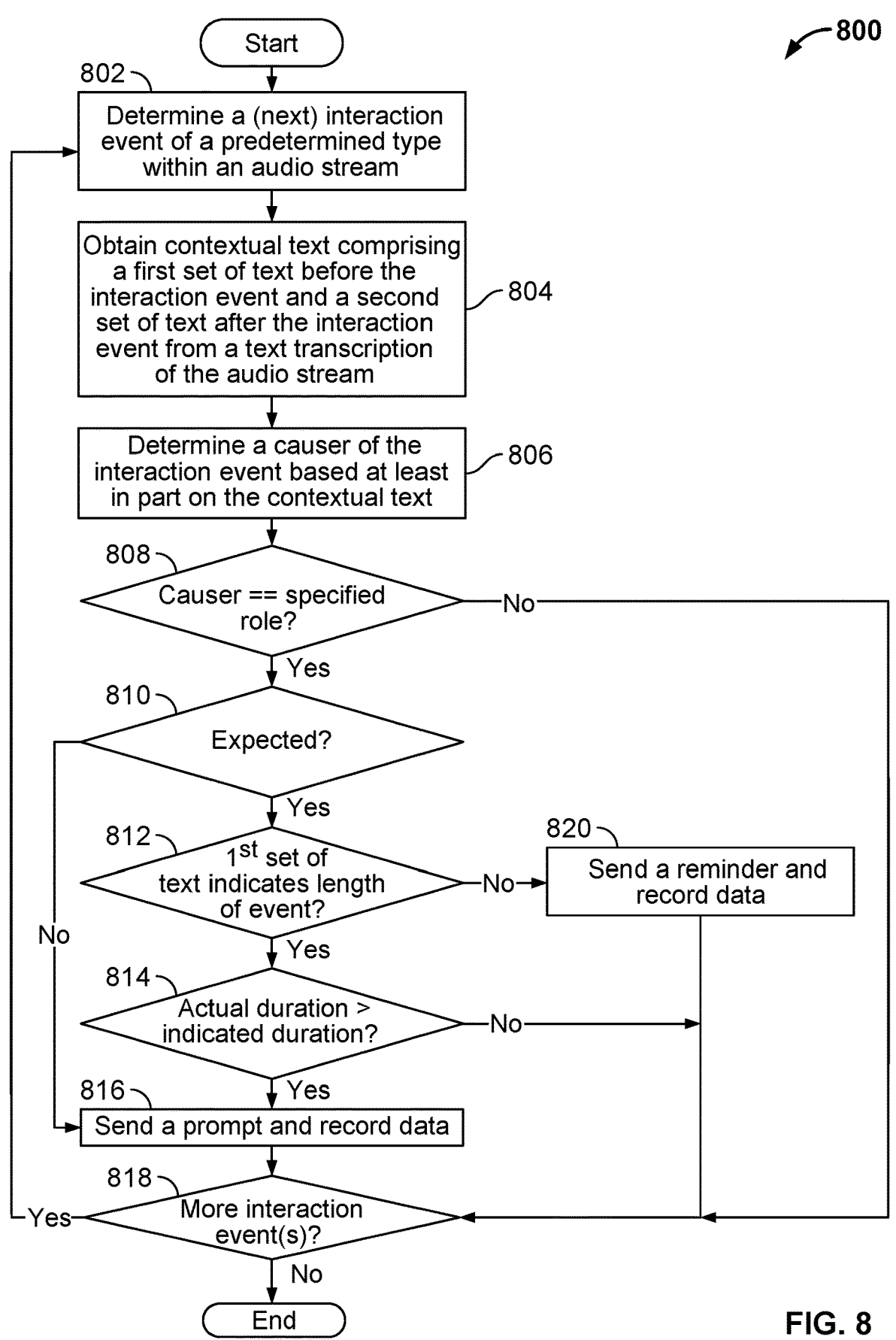
FIG. 8 is a flow diagram showing an example of a process for classifying interaction events in accordance with some embodiments.

FIG. 8 is a flow diagram showing an example of a process for classifying interaction events in accordance with some embodiments. In some embodiments, process 800 is implemented at interaction event detection server 108 of FIG. 1. In some embodiments, steps 304 and 306 of process 300 of FIG. 3 may be performed using a process such as process 800.

Process 800 describes an example process for performing classification of interaction events that have been detected in an audio stream that is still being recorded.

At 802, a (next) interaction event of a predetermined type is determined within an audio stream. In some embodiments, an interaction event of a predetermined type (e.g., silence) can be detected in either a completed or ongoing audio stream using a process such as process 500 of FIG. 5. In particular, the interaction event of a predetermined type (e.g., silence) that is determined at 802 can comprise a series of consecutive interaction events (or a continuous interaction event) for which the end has been determined within the audio stream.

At 804, contextual text comprising a first set of text before the interaction event and a second set of text after the interaction event is obtained from a text transcription of the audio stream. Based on the time information (e.g., timestamps) that is associated with the detected interaction event, contextual text corresponding to that interaction event is determined from the time aligned text transcription that is generated from the audio stream. The contextual text includes a first predetermined number of words that are before (to the left of) the start timestamp of the interaction event and the contextual text also includes a second predetermined number of words that are after (to the right of) the end timestamp of the interaction event. For example, if the interaction event (or the series of continuous interaction events) started at time T1 and ended at time T2, then the contextual text would include a first predetermined number of words that appear in the text transcription before time T1 and also a second predetermined number of words that appear in the text transcription after time T2.

In some embodiments, if the audio stream is still ongoing and therefore the detection and classification of interaction events is being performed in real-time, a greater number of words that precede the duration of the interaction event can be taken than words that follow the duration of the interaction event in the contextual text so that the classification would not need to wait for audio newer than the interaction event to be recorded. For example, in a real-time interaction event detection and classification context, 30 words to the left of the interaction event and 20 words to the right of the interaction event can be taken as the contextual text corresponding to that event. Otherwise, if the audio stream has completed and therefore the detection and classification of interaction events are not being performed in real-time, a similar number of words that precede the duration of the interaction event can be taken as the number of words that follow the duration of the interaction event in the contextual text because all of the audio/text transcription is already available.

At 806, a causer of the interaction event is determined based at least in part on the contextual text. The causer of the interaction event is the participant of the exchange in the audio stream that had caused the interaction event of the predetermined type (e.g., silence) to occur. For example, the causer could have caused the predetermined type to occur by no longer speaking or otherwise becoming unavailable to the other participant(s). The causer of the interaction event is determined by feeding the contextual text, along with the information regarding which participant had spoken which portions of the contextual text, corresponding to the interaction event into the text-based interaction classification model. In response to the input, the text-based interaction classification model is configured to output the participant that had caused the interaction event. For example, a participant could have caused the interaction event (e.g., silence) by signaling that it would happen and/or by not signaling that it would happen and then inadvertently causing it to occur during the recorded exchange.

At 808, whether the causer is associated with a specified role is determined. In the event that the causer is associated with the specified role, control is transferred to 810. Otherwise, in the event that the causer is not associated with the specified role, control is transferred to 818. In various embodiments, whether an action is to be performed based on a detected interaction event of a predetermined type depends on the role of the participant that had caused the event. For example, if the recorded audio stream is between a contact center agent and a customer, only an interaction event of a predetermined type (e.g., silence) that is caused by the agent is potentially actionable (from the perspective of the contact center management that may want to improve the performance of the agent) whereas a silence caused by the customer is not actionable (from the perspective of the contact center management). In some embodiments, stored rules may specify a role of the causer of the interaction event of a predetermined type for which an action may be prescribed and if the determined causer of the event does not have this role, then no further processing needs to be performed with respect to the event. However, if the causer of the interaction event of a predetermined type has a role that matches that which is specified in stored rules, then further processing should be performed with respect to the event, such as described below in process 800.

At 810, whether the interaction event is expected is determined. In the event that the interaction event is expected, control is transferred to 812. Otherwise, in the event that the interaction event is not expected, control is transferred to 816. Whether the interaction event is expected or unexpected is also determined by feeding the contextual text, along with the information regarding which participant had spoken which portions of the contextual text corresponding to the interaction event, into the text-based interaction classification model. In response to the input, the text-based interaction classification model is configured to output whether the interaction event was expected or unexpected. For example, the interaction event is expected if a speaker either explicitly instructs on an upcoming interaction event of a predetermined type (e.g., silence) or there is a mutual understanding between the participants about a silent segment. For example, an interaction event can be caused by either the causer of the event or another participant in the exchange. In a first specific example, if the expected interaction event is silence, the silence could have been caused by the causer who asked to have a moment to perform a task. In a second specific example, if the expected interaction event is silence, the silence could have been caused by a participant that is opposite to the causer who had asked the non-causer participant to perform a task.

At 812, whether the first set of text indicates a length of the interaction event is determined. In the event that the first set of text indicates a length of the interaction event, control is transferred to 814. Otherwise, in the event that the first set of text does not indicate a length of the interaction event, control is transferred to 820. If the contextual text that precedes the duration of the interaction event indicates a duration of the forthcoming interaction event, then that indicated duration will be compared against the actual duration of the interaction event.

At 820, a reminder is sent and data is recorded. In the event that no indicated duration of the interaction event is given prior to the interaction event, then a reminder could be potentially sent to the causer of the participant, which is associated with a specified role, to remind the causer of the interaction event to signal when a subsequent interaction event that he or she will cause will occur so that the other participant(s) can be better informed. Data related to this event can also be stored and used, for example, to provide coaching advice to the causer of the interaction event of a predetermined type. For example, statistics such as when such interaction events occur during calls can be gathered to determine which topics the events correlate with in the call. Subsequently, recommendation or coaching can be provided to agents for these correlated topics.

At 814, whether an actual duration associated with the interaction event is greater than an indicated duration associated with the interaction event is determined. In the event that an actual duration associated with the interaction event is greater than an indicated duration associated with the interaction event, control is transferred to 816. Otherwise, in the event that an actual duration associated with the interaction event is equal to or less than an indicated duration associated with the interaction event, control is transferred to 818. For example, an indicated duration is determined from the words in the left context of the interaction event in the text transcription. A machine learning model can be trained to identify whether text indicates a time duration or no time duration (e.g., when no time duration or when a phrase indicates time but not in a literal sense such as "I just need a second"). The actual duration is the actual cumulative length (e.g., as determined by the running clock maintained in the detection process such as process 500 of FIG. 5) of the (continuous) interaction event.

At 816, a prompt is sent and data is recorded. In the event that the interaction event was unexpected or was expected but causer of the interaction event had indicated a duration that was shorter than the actual duration, data associated with that interaction event is recorded (e.g., to be used for later coaching) and a prompt is sent to the causer to remind the causer of the longer than expected interaction event. For example, to which client device and what the prompt may include can be dictated by stored rules. For example, a stored rule could indicate that if the interaction event of a predetermined type (e.g., a silence) were caused by an agent in an exchange with a customer and that the silence was not expected, then a prompt can be sent to the client device that is used by the agent to inform them of the unexpected silence so that the agent can be reminded to signal when he or she is to cause a subsequent silence. In a different example, a stored rule could indicate that if the interaction event of a predetermined type (e.g., a silence) were caused by an agent in an exchange with a customer and the agent did not give an accurate indication of how long the silence would be, then a prompt can be sent to the client device that is used by the agent to inform them of an inaccurate length of the silence that they provided so that the agent can be reminded to provide a more realistic length of silence for customers to anticipate. Data related to this event can also be stored and used, for example, to provide coaching advice to the causer of the interaction event of a predetermined type.

At 818, whether there is at least one more interaction event in the audio stream is determined. In the event that there is at least one more interaction event in the audio stream, control is returned to 802. Otherwise, in the event that there are no more interaction events in the audio stream, process 800 ends.

While process 800 describes classifying interaction events based on a text transcription of an audio stream, in some other embodiments, a process similar to process 800 can be applied to a text-based exchange (e.g., a chat log or an exchange of emails between two or more participants) and in which the text-based exchange includes interaction events that are detected within the text itself and that are to be classified based on its surrounding/contextual text.

Figure 9:
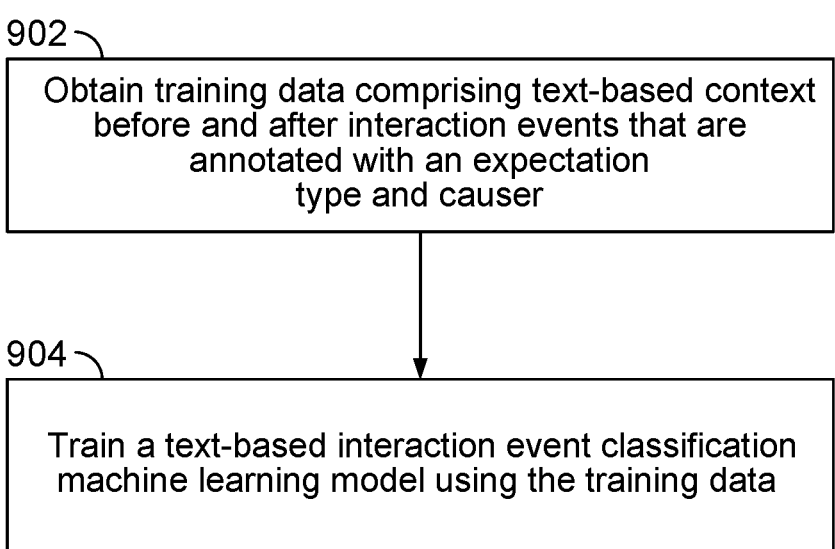
FIG. 9 is a flow diagram showing an example of a process for training a text-based interaction event classification machine learning model in accordance with some embodiments.

FIG. 9 is a flow diagram showing an example of a process for training a text-based interaction event classification machine learning model in accordance with some embodiments. In some embodiments, process 900 is implemented at interaction event detection server 108 of FIG. 1.

Process 900 describes one example technique of training a text-based interaction event classification model, which is used in embodiments described herein. For example, the audio-based interaction event detection model is used at steps 304 and 306 in process 300 of FIG. 3 and steps 806 and 808 in process 800 of FIG. 8.

At 902, training data comprising text-based context before and after interaction events that are annotated with an expected type and causer is obtained. Time aligned text transcriptions of recorded audio streams between at least two speakers are obtained. Locations within the audio streams at interaction events of a predetermined type are also determined. Then, context text comprising words in the transcription that precede and also follow each duration of an interaction event is obtained. Each such text snippet is then manually labeled with "expected" or "unexpected" and also the participant role that was the "causer." Also, tokens that indicate when which participant spoke and the duration of the associated interaction event (e.g., short, medium, and long durations) are included within each contextual text, text snippet.

At 904, a text-based interaction event classification machine learning model is trained using the training data. In a specific example, a RoBERTa model is trained on the annotated contextual text, text snippets. The resulting text-based interaction event classification model is configured to receive a text snippet as input and output which participant had caused the included interaction event and also whether that interaction event was expected or not. FIG. 10 describes specific examples of text snippets that can be used as training data to train the text-based interaction event classification model.

FIG. 10 is a diagram showing example text snippets on which a text-based interaction event classification model can be trained. Table 1000 shows four rows with four respective example text snippets and where each comprises contextual text relative to an annotated interaction event of a predetermined type. In the example of FIG. 10, the four text snippets were obtained from text transcriptions of phone calls between the participants of a contact center agent and a customer. Furthermore, in the example of FIG. 10, the predetermined type of interaction event that was detected and annotated in each text snippet is "silence" and so the interaction event that is annotated in each text snippet is sometimes referred to as a "silent segment." In FIG. 10, each text snippet further includes labeling of which turn in the contextual text belonged to which participant ("agent" or "customer"). As shown in FIG. 10, each text snippet includes text to the left of the annotated silent segment, the annotated silent segment, and also text to the right of the annotated silent segment. Furthermore, each text snippet is annotated with whether the silent segment is of the expected or unexpected type and also which of the participants had caused the silent segment (the "agent" or the "customer"). Additionally, an explanation is provided for why the causer participant had caused the silent segment. Where applicable, a text snippet also identifies the portions in the left context text in which the agent had signaled that a silent segment was forthcoming (e.g., provided instructions to the customer about the upcoming silence). For example, a RoBERTa model can be trained on a large body of text snippets similar to those described in FIG. 10 to result in a text-based interaction event classification model that is configured to receive as an input, an annotated text snippet that includes contextual text surrounding a detected interaction event of a predetermined type, and is to output whether that event was expected or unexpected and also which of the participants had caused the event.

FIGS. 11A-11D describe example user interfaces that can be presented at the client device that is used by a participant in an example of a real-time (live) detection and classification of an interaction event within a recorded call (audio stream) in accordance with some embodiments. In the examples of FIGS. 11A-11D, the participant to whom the user interfaces are presented has been determined to be the causer of the ongoing interaction event, which is a silence. In the examples of FIGS. 11A-11D, the call is between a contact center agent and a customer. In these examples, the agent has been identified as the causer of the current ongoing continuous silent segment in the call and as such, the user interfaces shown in FIGS. 11A-11D are presented for the agent at a device that is used by the agent.

In the example context of a call between a contact center agent and a customer, the agent is assisting the customer with a task and while silent segments are to be expected to occur, in the interest of providing efficient and quality customer service, it is desirable for the agent to minimize the presence of long silent segments if the agent is the causer of the silences. To that end, the user interfaces shown in FIGS. 11A-11D can provide real-time (live) feedback to the agent to inform him or her of the current state of an ongoing silent segment and also to provide coaching tips on how to address the customer accordingly, especially as the agent may be occupied performing a task and not able to manually track the length of silences in the call.

Figure 11A:
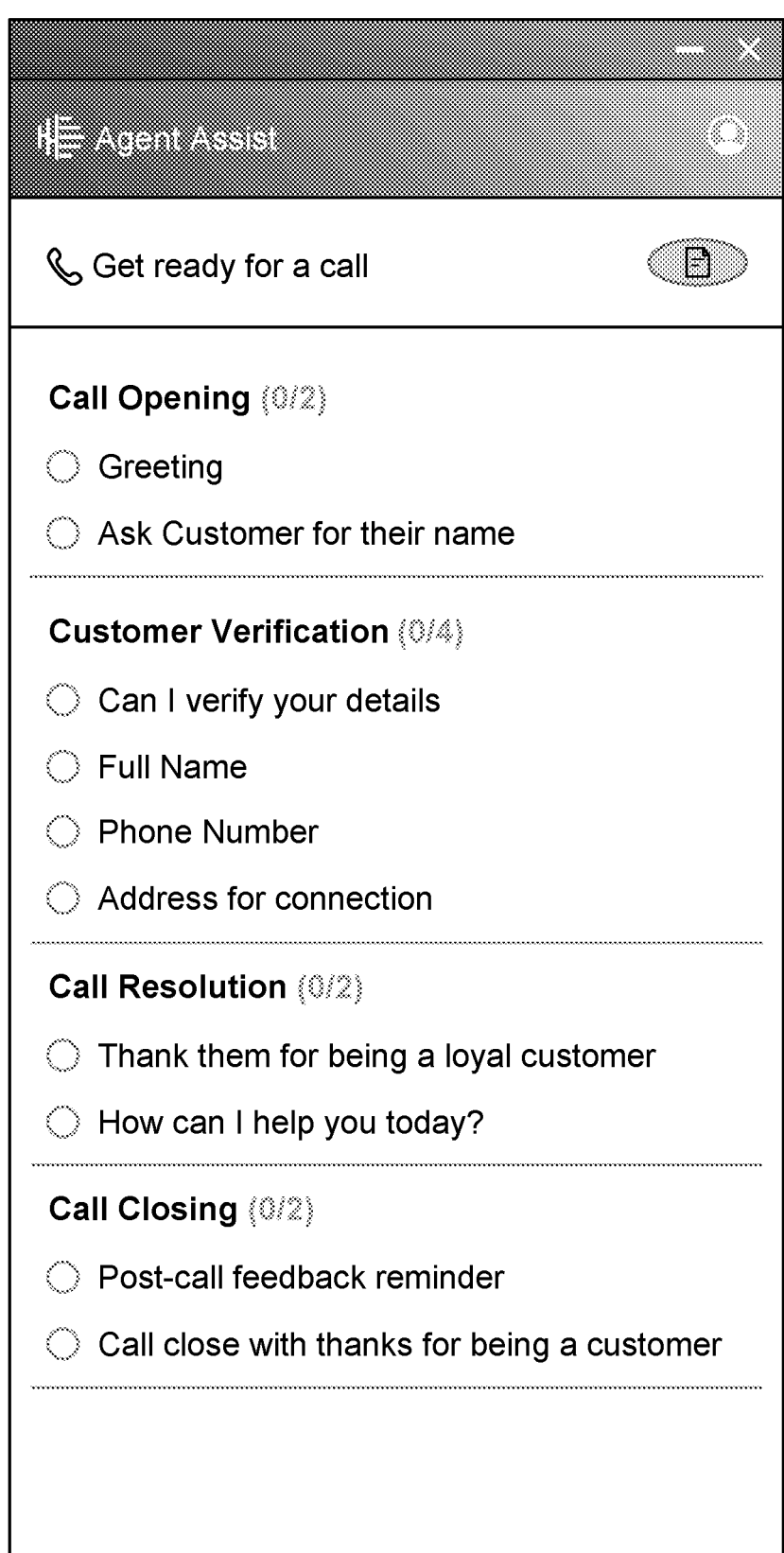
FIGS. 11A-11D describe example user interfaces that can be presented at the client device that is used by a participant in an example of a real-time (live) detection and classification of an interaction event within a recorded call (audio stream) in accordance with some embodiments.

FIG. 11A shows an example user interface that is presented to an agent prior to starting a conversation with a customer. While no conversation is taking place between the agent and the customer, the example user interface as shown in FIG. 11A displays a list/sequence of tasks to be performed by the agent when a new conversation is started with a customer. The list of tasks is grouped by category. For example, under the first category of "Call Opening," the agent is expected to perform a greet and also ask the customer for their name.

Figure 11B:
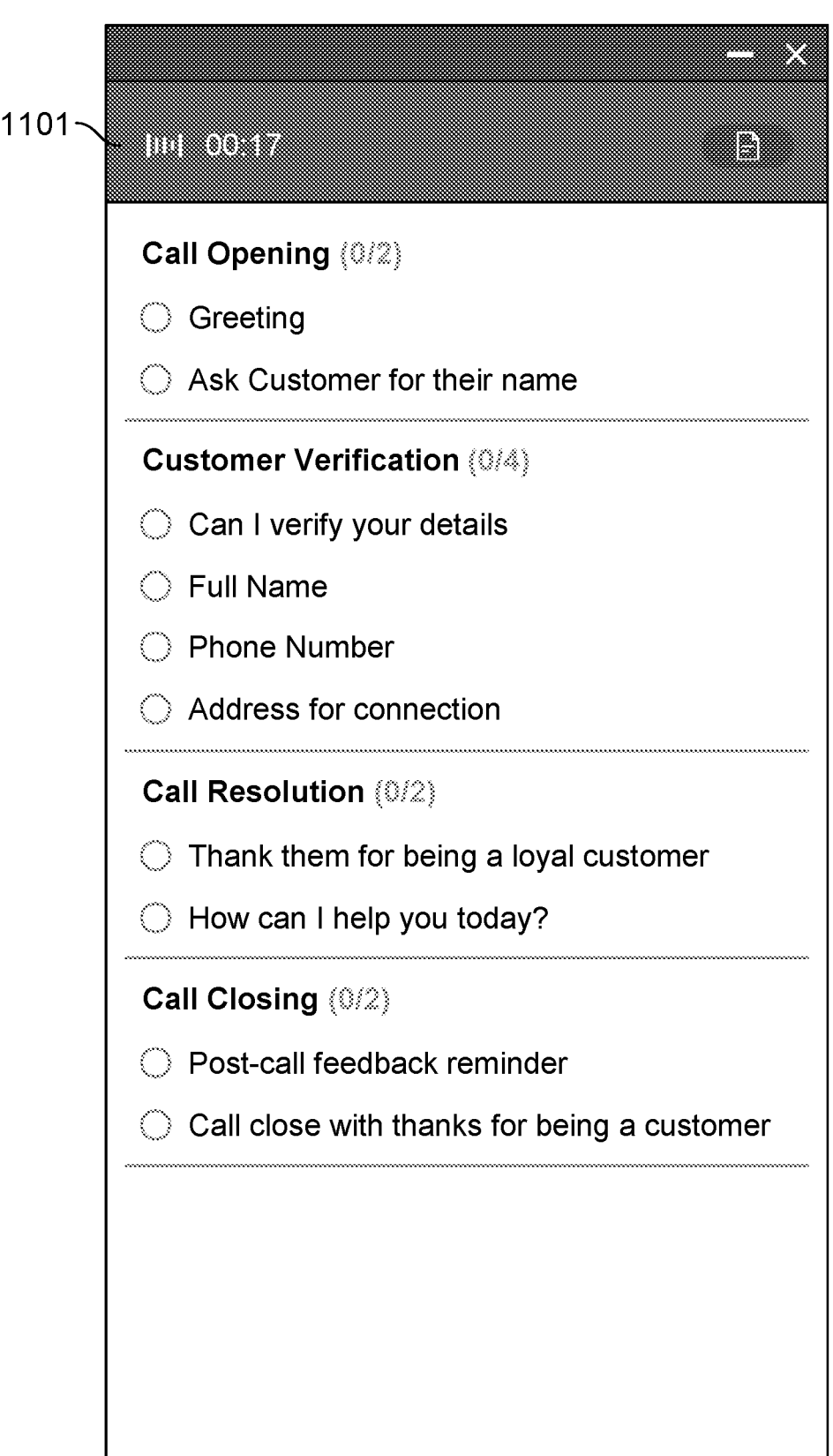

FIG. 11B shows an example user interface that is presented to the agent after a conversation with a customer has begun. Timer 1101 tracks the current length of the conversation between the agent and the customer. As the conversation progresses, tasks of the list that are completed by the agent (e.g., as determined by programmatically applying machine learning to the audio and/or the text transcription of the conversation) are removed from being displayed at the user interface.

Figure 11C:
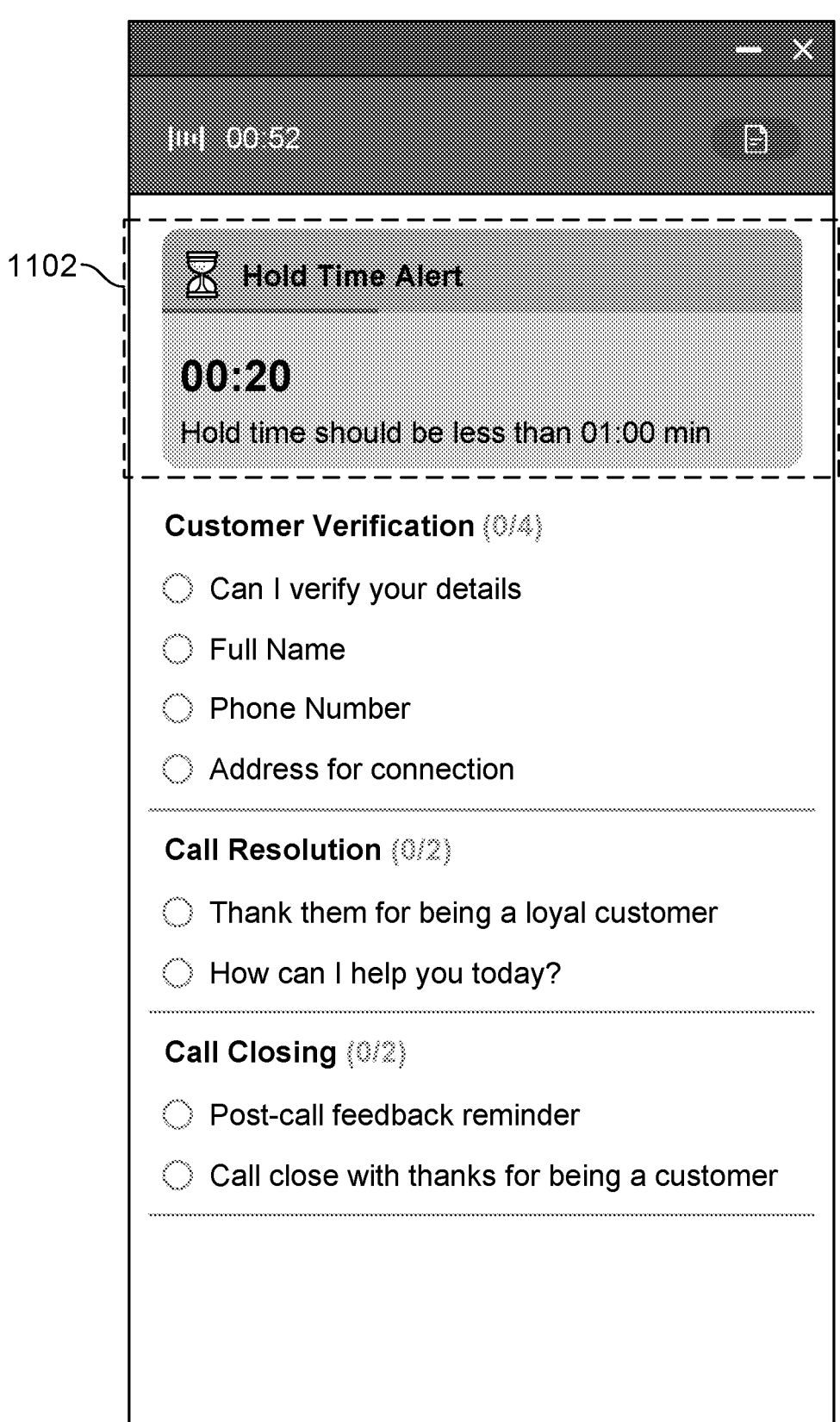

FIG. 11C shows an example user interface that is presented to the agent when the current ongoing silent segment has been detected for 20 seconds. Timer presentation 1102 shows that the current ongoing silent segment has been detected for 20 seconds and that the overall silent segment should not exceed one minute. The one-minute limit could have been specified as a limit in a stored rule or a dynamically generated rule with respect to detected interaction events. Alternatively, the one-minute limit could have been indicated by the agent to the customer during the call in advance of the start of the silent segment. The silent segment could have been detected within the audio stream of the call and its duration tracked using a process such as process 500 of FIG. 5.

Figure 11D:
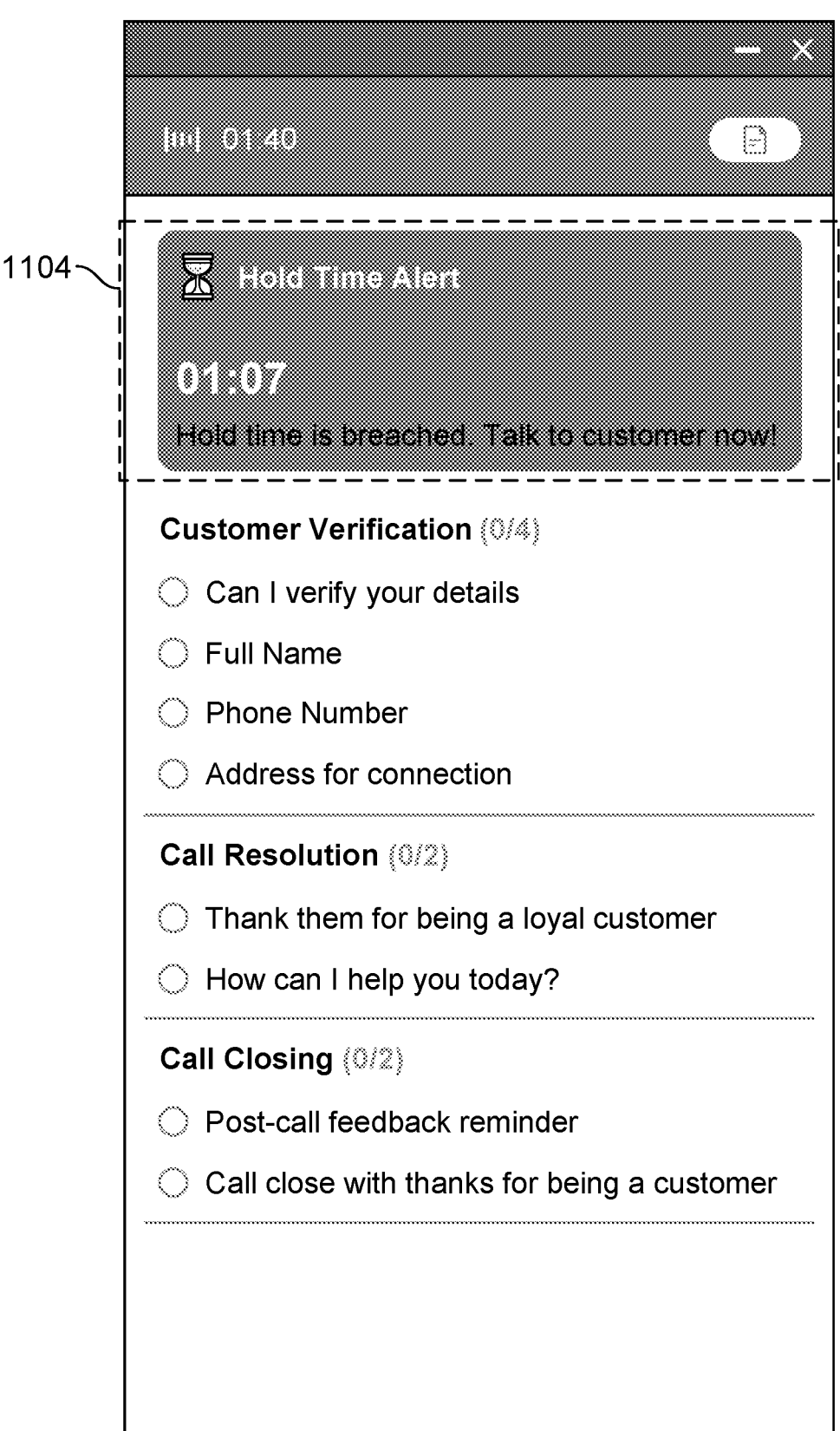

FIG. 11D shows an example user interface that is presented to the agent when the current ongoing silent segment has been detected for at least one minute. Timer presentation 1104 shows that the current ongoing silent segment has been detected for at least one minute, which exceeds the one minute that was indicated in FIG. 11C. Because the one-minute limit has been reached, timer presentation 1104 shows a bolder presentation (in contrast to the lighter colored presentation that was shown in FIG. 11C) and also a coaching tip for addressing the current silent segment ("Hold time is breached. Talk to customer now!"). The coaching tip prompt could have been sent to the agent in response to a detection that the agent was the causer of the silence using a process such as process 800 of FIG. 8. In response to timer presentation 1104 and the coaching tip included therein, the agent could let the customer know why the agent has not been able to return to the call and/or when the agent might return to the call. For example, timer presentation 1104 can be hidden when the real-time (live) interaction event detects that the continuous silent segment has ended (e.g., speech is once again detected within the newly recorded portion of the call).

While several examples described above involve detecting and classifying interaction events that are silences, in some other examples, interaction events that are background noise can be detected. In particular, if the detected background noise is caused by a participant (e.g., an agent in a customer service call with a customer), a prompt could be sent to the agent to remind the agent to check the ambient noise and make sure it will get reduced. If the background noise is detected to persist, then a subsequent prompt can be sent to the agent to remind the agent to speak clearly and loudly so that comprehension can be better on the customer's side.

Figure 12A:
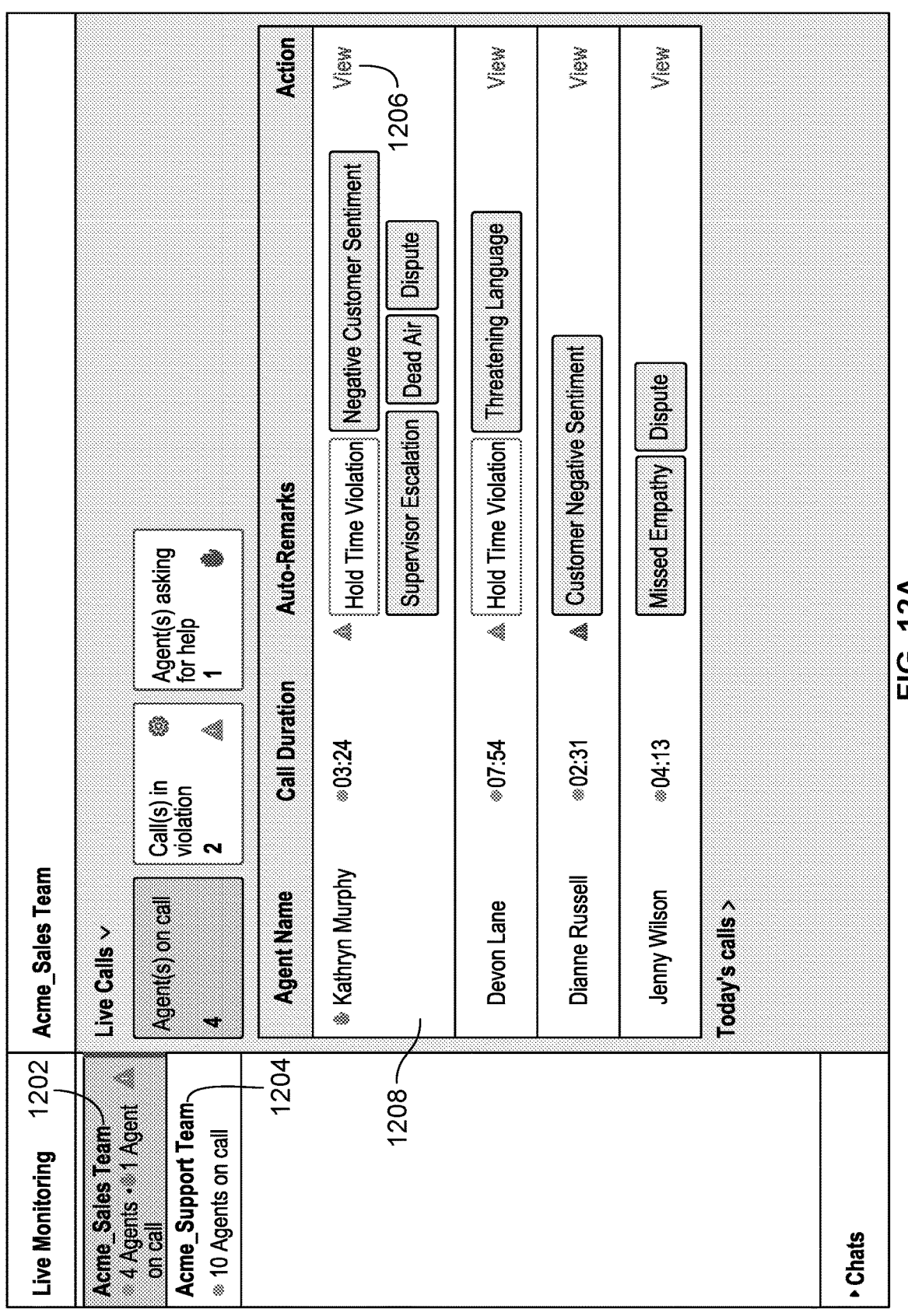
FIGS. 12A-12C describe example user interfaces that can be presented at the client device that is used by a supervisor of multiple participants in an example of intervention that can be prompted of supervisors in an example application of real-time (live) detection and classification of an interaction event within a recorded call (audio stream) in accordance with some embodiments.
Figure 12B:
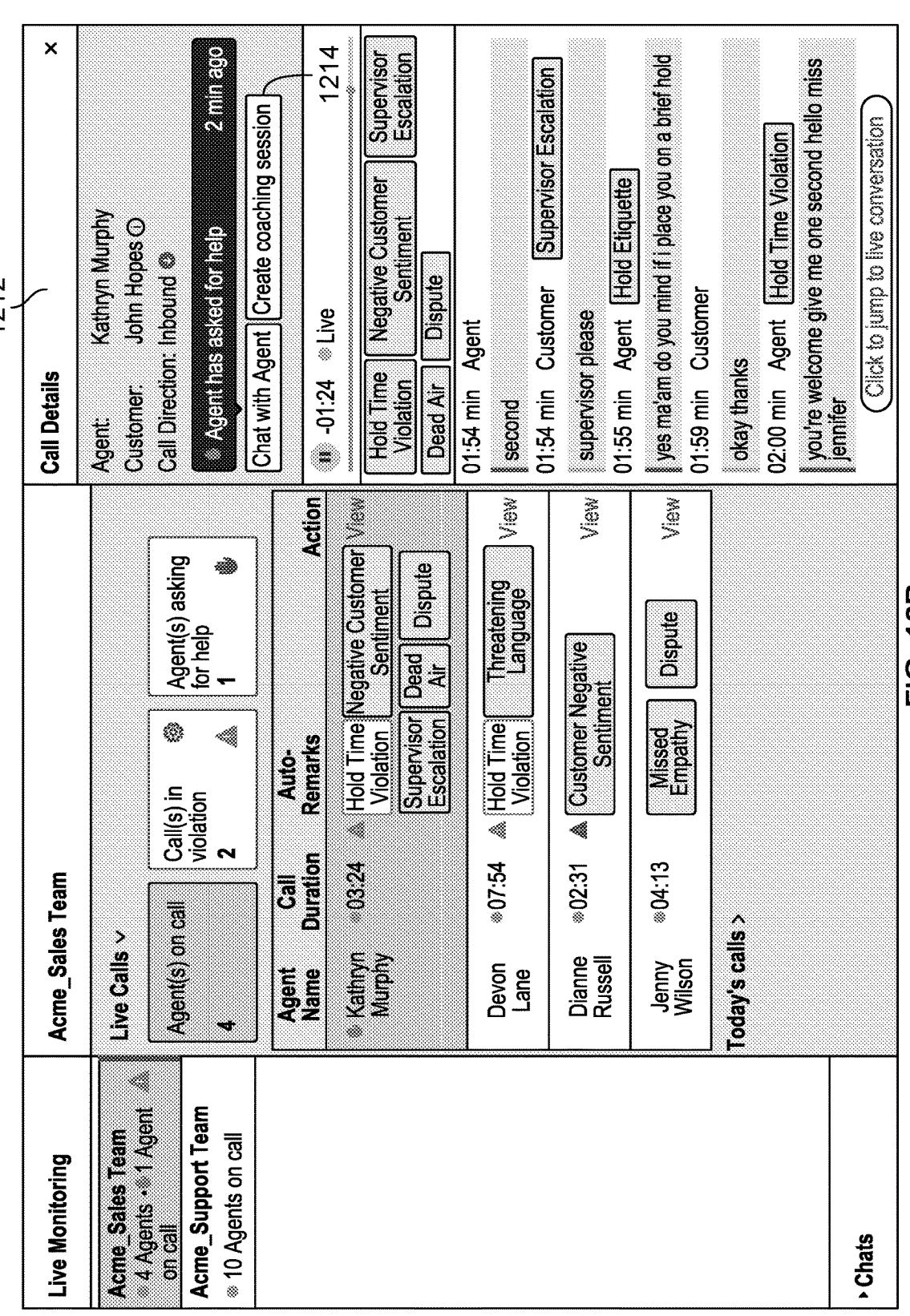
Figure 12C:
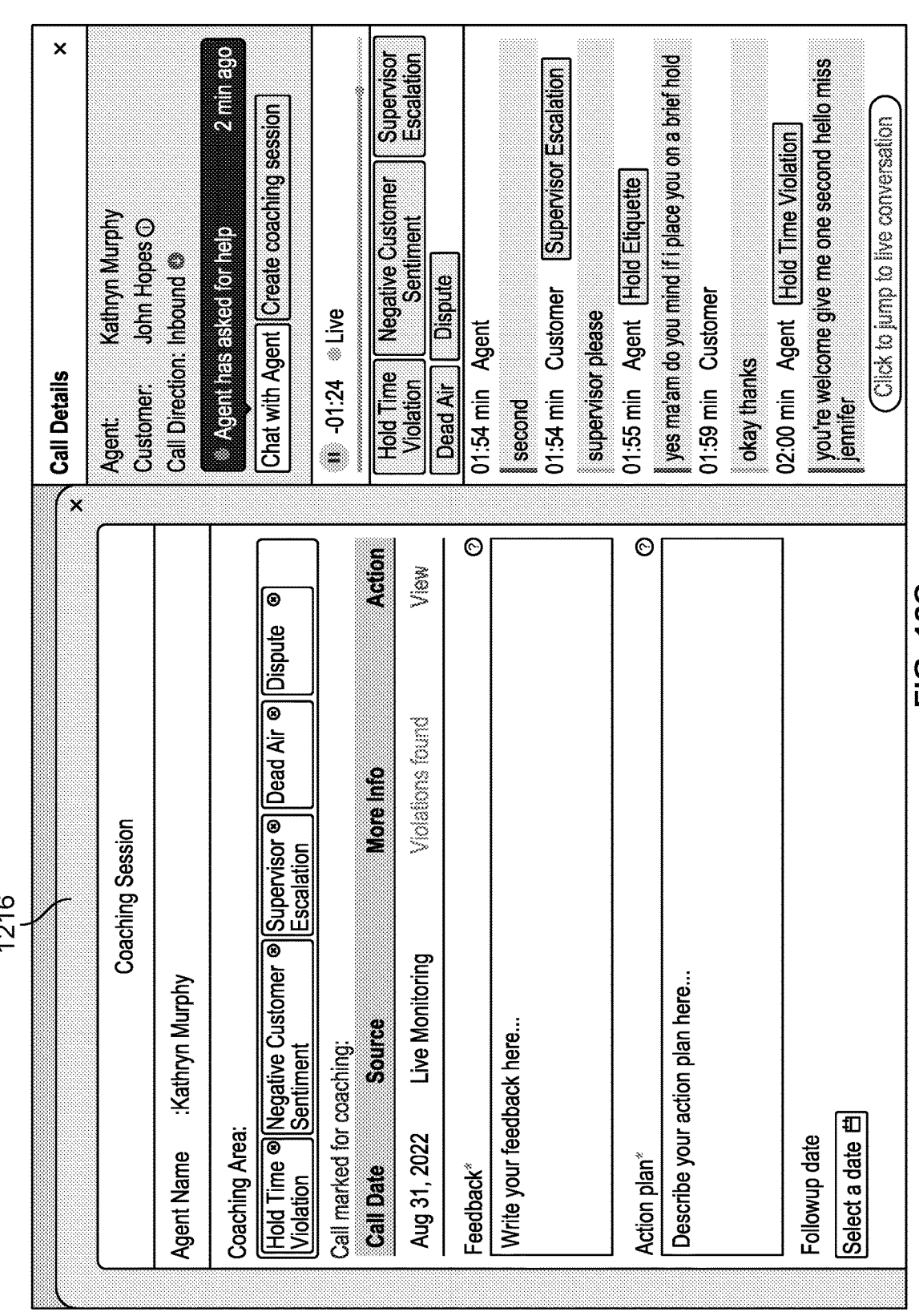

FIGS. 12A-12C describe example user interfaces that can be presented at the client device that is used by a supervisor of multiple participants in an example of intervention that can be prompted of supervisors in an example application of real-time (live) detection and classification of an interaction event within a recorded call (audio stream) in accordance with some embodiments. In the examples of FIGS. 12A-12C, the supervisor to whom the user interfaces are presented is tasked with real-time (live) management of multiple customer service agents as they provide customer service over conversations with customers. In the examples of FIGS. 12A-12C, when an agent has been determined to be the causer of one or more interaction events (e.g., including a silent segment that exceeds a time limit), the supervisor is notified of such events and is provided the opportunity to intervene in that corresponding conversation in a real-time manner and/or provide a coaching session to the relevant agent based on the programmatically detected interaction events.

FIG. 12A shows an example user interface of the live status of real-time conversations between customer service agents and respective customers. In the "Live Monitoring" user interface for a supervisor that is shown in FIG. 12A, there are two tabs, 1202 and 1204, each of which corresponds to the live status of real-time conversations associated with a respective set of monitored customer service agents ("Acme_Sales Team" and "Acme_Support Team"). In the example of FIG. 12A, tab 1202 associated with "Acme_Sales Team" has been selected. Selected tab 1202 shows a table with the live status information of each of the respective conversations ("calls") associated with each of the four agents on the "Acme_Sales Team" and summaries associated with these four calls. As shown in FIG. 12A, the summary associated with the four live calls includes how many agents are currently on a live call ("4"), how many agents in the live calls have had hold-time violations ("2"), and the number of agents that are currently asking for help ("1"). Each call between an agent and a respective customer is shown with the agent's name, the current call duration, auto-remarks (e.g., that are generated based on identified and classified interaction events from the call using a process such as process 800 of FIG. 8), and a selectable link ("Action") to perform an action with respect to that agent. For example, for the call that agent Kathryn Murphy 1208 is on with a customer, the table shows that the agent has asked for help, the call duration is "03:24," and that there has been detected within the call: a hold-time violation (e.g., there was a silent segment that exceeded a specified time limit), negative customer sentiment, supervisor escalation, dead air, and a dispute. To perform an action with respect to agent Kathryn Murphy 1208, the supervisor can select "Action" link 1206.

FIG. 12B shows an example user interface of the live status of a real-time conversation between a specific agent and customer. For example, the user interface of FIG. 12B could have been presented in response to the supervisor's selection of "Action" link 1206 corresponding to agent Kathryn Murphy at the user interface that is presented at FIG. 12A. In particular, FIG. 12B shows window 1212 that includes call details corresponding to the call associated with agent Kathryn Murphy. Window 1212 shows call details including the name of the agent ("Kathryn Murphy"), the name of the customer ("John Hopes"), the call direction relative to the contact center ("Inbound"), selectable buttons to create actions with the agent ("Chat with Agent" and "Create coaching session"), and annotations of locations in the call at which interaction events (e.g., a hold-time violation, negative customer sentiment, supervisor escalation, dead air, and a dispute) were programmatically detected. To create a coaching session with the agent to discuss some of the detected interaction events (including the hold-time violation), the supervisor can select "Create coaching session" button 1214.

FIG. 12C shows an example user interface for creating a coaching session with the agent. For example, the user interface of FIG. 12C could have been presented in response to the supervisor's selection of "Create coaching session" button 1214 at the user interface that is presented at FIG. 12B. In particular, FIG. 12C shows coaching session form 1216 that is prepopulated with coaching areas that are determined based on the interaction events (e.g., a hold-time violation, negative customer sentiment, supervisor escalation, dead air, and a dispute) that were programmatically detected during the call between agent Kathryn Murphy and the customer. Form 1216 also includes fields (e.g., "Feedback" and "Action plan") that the supervisor can fill out with information that will be provided to the agent so that the agent can review upon reflection on this particular call.

FIG. 13 is a diagram showing an example user interface that shows the information associated with recorded conversations (after the audio streams have concluded) between a group of agents and respective customers. The example user interface of FIG. 13 could be presented at a user interface for a supervisor of agents to inform the supervisor about some monitored call statistics associated with each agent and the customer calls that they have participated in. For example, FIG. 13 shows that across all agents, the customer call duration is "4:21 min," the average silence duration is "234 sec," the average dead air of a 10 second duration is "889 sec," and that the average hold time violation of 120 seconds is "145 sec." Furthermore, FIG. 13 shows the total number of calls, the average call duration, and the average silence duration for each agent across the calls that they have been on. At least some of these values could have been determined based on using a process such as process 800 of FIG. 8.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

detect an interaction event within a recorded audio stream, wherein to detect the interaction event within the recorded audio stream comprises to:

divide the recorded audio stream into a plurality of audio frames;

determine an audio segment based at least in part on audio frames that are included in a sliding window;

determine that a subset of audio frames within the audio segment includes the interaction event; and determine a time segment within the recorded audio stream corresponding to a duration during which the interaction event is detected within the recorded audio stream, wherein the time segment comprises a start timestamp that denotes a start associated with the interaction event and an end timestamp that denotes an end associated with the interaction event;

obtain a text transcription of the recorded audio stream, wherein the text transcription is time aligned with speech in the recorded audio stream and includes annotations of participants for respective speaking turns;

analyze contextual text comprising a first portion of text in the text transcription that precedes the time segment associated with the interaction event and a second portion of text in the text transcription that follows the time segment associated with the interaction event in the recorded audio stream to determine a causer of the interaction event, wherein the first portion of text in the text transcription comprises a first predetermined number of words in the text transcription that precedes the start timestamp associated with the interaction event, and wherein the second portion of text in the text transcription comprises a second predetermined number of words in the text transcription that follows the end timestamp associated with the interaction event, wherein to determine the causer of the interaction event comprises to input the contextual text comprising the first portion of text and the second portion of text into a text-based interaction event classification model, wherein the text-based interaction event classification model is configured to output information indicating the causer of the interaction event, wherein the text-based interaction event classification model has been trained on training data comprising labeled text snippets associated with recorded interactions, wherein a labeled text snippet includes: contextual text surrounding a detected interaction event within the labeled text snippet, a set of first labels indicating which speaking turn in the contextual text belongs to which of a first participant role and a second participant role in a corresponding recorded interaction, a second label indicating which of the first participant role and the second participant role had caused the detected interaction event within the labeled text snippet, and a third label indicating whether the detected interaction event within the labeled text snippet was expected or unexpected; and determine an action to be performed in response to the interaction event based at least in part on the causer of the interaction event; and a memory coupled to the processor and configured to provide the processor with instructions.

2. The system of claim 1, wherein the processor is further configured to determine whether the interaction event is associated with a predetermined type.

3. The system of claim 2, wherein the predetermined type is silence.

4. The system of claim 1, wherein to determine whether the audio segment includes the interaction event comprises to input the audio segment into an audio-based interaction event detection machine learning model.

5. The system of claim 1, wherein the processor is configured to start a new clock in response to the detection of the interaction event.

6. The system of claim 5, wherein the duration comprises a first duration, and wherein the processor is configured to determine that a second duration indicated by the new clock is greater than a threshold duration and send a prompt to a client device.

7. The system of claim 1, wherein the first portion of text and the second portion of text comprises the contextual text associated with the interaction event.

8. The system of claim 1, wherein the text-based interaction event classification model is further configured to output whether the interaction event was a first predefined classification or a second predefined classification.

9. The system of claim 1, wherein the processor is further configured to determine an indicated duration of the interaction event within text before the interaction event.

10. The system of claim 9, wherein the processor is further configured to:

determine an actual duration associated with the interaction event;

compare the actual duration to the indicated duration; and in response to a determination that the actual duration is greater than the indicated duration, send a prompt to a client device associated with a participant in the recorded audio stream.

11. The system of claim 9, wherein the processor is further configured to:

determine an actual duration associated with the interaction event;

compare the actual duration to the indicated duration; and in response to a determination that the actual duration is greater than the indicated duration, store data corresponding to the interaction event and wherein the stored data is configured to be used for report generation, analytics, or downstream processing.

12. The system of claim 9, wherein the processor is further configured to:

determine an actual duration associated with the interaction event;

compare the actual duration to the indicated duration; and in response to a determination that the actual duration is greater than the indicated duration, send a prompt to a supervisor of a participant in the recorded audio stream.

13. The system of claim 12, wherein the prompt indicates that the interaction event comprises a hold violation.

14. The system of claim 1, wherein the action to be performed comprises to send a prompt to a supervisor of a first speaking role in the recorded audio stream to indicate one or more of the following: that a second speaking role in the recorded audio stream was exhibiting a negative sentiment or that the second speaking role was exhibiting a lack of comprehension over speech by the first speaking role.

15. The system of claim 1, wherein the recorded audio stream comprises a live recording of audio.

16. The system of claim 1, wherein the recorded audio stream is associated with a videoconference-based meeting.

17. The system of claim 1, wherein the first predetermined number of words is different from the second predetermined number of words.

18. The system of claim 1, wherein the labeled text snippet further includes a fourth label comprising an explanation for why whichever of the first participant role and the second participant role had caused the detected interaction event within the labeled text snippet.

19. A method, comprising:

detecting an interaction event within a recorded audio stream, wherein detecting the interaction event within the recorded audio stream comprises:

dividing the recorded audio stream into a plurality of audio frames;

determining an audio segment based at least in part on audio frames that are included in a sliding window;

determining that a subset of audio frames within the audio segment includes the interaction event; and determining a time segment within the recorded audio stream corresponding to a duration during which the interaction event is detected within the recorded audio stream, wherein the time segment comprises a start timestamp that denotes a start associated with the interaction event and an end timestamp that denotes an end associated with the interaction event;

obtaining a text transcription of the recorded audio stream, wherein the text transcription is time aligned with speech in the recorded audio stream and includes annotations of participants for respective speaking turns;

analyzing contextual text comprising a first portion of text in the text transcription that precedes the time segment associated with the interaction event and a second portion of text in the text transcription that follows the time segment associated with the interaction event in the recorded audio stream to determine a causer of the interaction event, wherein the first portion of text in the text transcription comprises a first predetermined number of words in the text transcription that precedes the start timestamp associated with the interaction event, and wherein the second portion of text in the text transcription comprises a second predetermined number of words in the text transcription that follows the end timestamp associated with the interaction event, wherein to determine the causer of the interaction event comprises to input the contextual text comprising the first portion of text and the second portion of text into a text-based interaction event classification model, wherein the text-based interaction event classification model is configured to output information indicating the causer of the interaction event, wherein the text-based interaction event classification model has been trained on training data comprising labeled text snippets associated with recorded interactions, wherein a labeled text snippet includes: contextual text surrounding a detected interaction event within the labeled text snippet, a set of first labels indicating which speaking turn in the contextual text belongs to which of a first participant role and a second participant role in a corresponding recorded interaction, a second label indicating which of the first participant role and the second participant role had caused the detected interaction event within the labeled text snippet, and a third label indicating whether the detected interaction event within the labeled text snippet was expected or unexpected; and determining an action to be performed in response to the interaction event based at least in part on the causer of the interaction event.

20. A computer program product, the computer program product being embodied in a non-transitory computer readable storage medium and comprising computer instructions for:

detecting an interaction event within a recorded audio stream, wherein detecting the interaction event within the recorded audio stream comprises:

dividing the recorded audio stream into a plurality of audio frames;

determining an audio segment based at least in part on audio frames that are included in a sliding window;

determining that a subset of audio frames within the audio segment includes the interaction event; and determining a time segment within the recorded audio stream corresponding to a duration during which the interaction event is detected within the recorded audio stream, wherein the time segment comprises a start timestamp that denotes a start associated with the interaction event and an end timestamp that denotes an end associated with the interaction event;

obtaining a text transcription of the recorded audio stream, wherein the text transcription is time aligned with speech in the recorded audio stream and includes annotations of participants for respective speaking turns;

analyzing contextual text comprising a first portion of text in the text transcription that precedes the time segment associated with the interaction event and a second portion of text in the text transcription that follows the time segment associated with the interaction event in the recorded audio stream to determine a causer of the interaction event, wherein the first portion of text in the text transcription comprises a first predetermined number of words in the text transcription that precedes the start timestamp associated with the interaction event, and wherein the second portion of text in the text transcription comprises a second predetermined number of words in the text transcription that follows the end timestamp associated with the interaction event, wherein to determine the causer of the interaction event comprises to input the contextual text comprising the first portion of text and the second portion of text into a text-based interaction event classification model, wherein the text-based interaction event classification model is configured to output information indicating the causer of the interaction event, wherein the text-based interaction event classification model has been trained on training data comprising labeled text snippets associated with recorded interactions, wherein a labeled text snippet includes: contextual text surrounding a detected interaction event within the labeled text snippet, a set of first labels indicating which speaking turn in the contextual text belongs to which of a first participant role and a second participant role in a corresponding recorded interaction, a second label indicating which of the first participant role and the second participant role had caused the detected interaction event within the labeled text snippet, and a third label indicating whether the detected interaction event within the labeled text snippet was expected or unexpected; and determining an action to be performed in response to the interaction event based at least in part on the causer of the interaction event.

\* \* \* \* \*